(12) United States Patent
Rappaport et al.

(10) Patent No.: US 7,164,883 B2
(45) Date of Patent: Jan. 16, 2007

(54) METHOD AND SYSTEM FOR MODELING AND MANAGING TERRAIN, BUILDINGS, AND INFRASTRUCTURE

(75) Inventors: Theodore S. Rappaport, Salem, VA (US); Roger R. Skidmore, Blacksburg, VA (US); Praveen Sheethalnath, San Diego, CA (US)

(73) Assignee: Motorola. Inc., Schaumburg, IL (US)

( * ) Notice: Subject to any disclaimer, the term of this patent is extended or adjusted under 35 U.S.C. 154(b) by 1036 days.

(21) Appl. No.: 09/954,273

(22) Filed: Sep. 18, 2001

(65) Prior Publication Data

US 2003/0023412 A1 Jan. 30, 2003

Related U.S. Application Data

(60) Provisional application No. 60/268,360, filed on Feb. 14, 2001.

(51) Int. Cl.
*H04H 1/00* (2006.01)
*H04Q 7/20* (2006.01)
*G06Q 17/50* (2006.01)

(52) U.S. Cl. .............................. 455/3.1; 455/450; 703/1

(58) Field of Classification Search ................. 703/21, 703/1; 379/27.04; 455/899, 3.01, 450; 709/200, 709/218
See application file for complete search history.

(56) References Cited

U.S. PATENT DOCUMENTS

| 4,675,147 | A | 6/1987 | Schaefer et al. |
| 4,736,453 | A | 4/1988 | Schloemer |
| 4,885,694 | A | 12/1989 | Pray et al. |
| 5,111,392 | A | 5/1992 | Malin |
| 5,119,307 | A | 6/1992 | Blaha et al. |
| 5,239,487 | A | 8/1993 | Horejsi et al. |
| 5,293,640 | A | 3/1994 | Gunmar et al. |
| 5,307,261 | A | 4/1994 | Maki et al. |
| 5,337,149 | A | 8/1994 | Kozah et al. |
| 5,339,184 | A | 8/1994 | Tang |
| 5,375,123 | A | 12/1994 | Andersson et al. |
| 5,394,522 | A | 2/1995 | Sanchez-Frank et al. |
| 5,425,076 | A * | 6/1995 | Knippelmier ............ 379/27.04 |
| 5,450,615 | A | 9/1995 | Fortune et al. |
| 5,458,123 | A | 10/1995 | Unger |
| 5,465,390 | A | 11/1995 | Cohen |
| 5,467,441 | A | 11/1995 | Stone et al. |
| 5,482,050 | A | 1/1996 | Smokoff et al. |
| 5,485,568 | A | 1/1996 | Venable et al. |
| 5,491,644 | A | 2/1996 | Pickering et al. |
| 5,491,837 | A | 2/1996 | Haartsen |
| 5,493,679 | A | 2/1996 | Virgil et al. |
| 5,515,269 | A | 5/1996 | Willis et al. |

(Continued)

OTHER PUBLICATIONS

Trademark, "Siteplanner" 1999. p. 1.*

(Continued)

*Primary Examiner*—Paul Rodriguez
*Assistant Examiner*—Thomas H. Stevens

(57) ABSTRACT

A method and system for creating, using, and managing a three-dimensional digital model of the physical environment combines outdoor terrain elevation and land-use information, building placements, heights and geometries of the interior structure of buildings, along with site-specific models of components that are distributed spatially within a physical environment. The present invention separately provides an asset management system that allows the integrated three-dimensional model of the outdoor, indoor, and distributed infrastructure equipment to communicate with and aggregate the information pertaining to actual physical components of the actual network, thereby providing a management system that can track the on-going performance, cost, maintenance history, and depreciation of multiple networks using the site-specific unified digital format.

105 Claims, 18 Drawing Sheets

U.S. PATENT DOCUMENTS

| | | |
|---|---|---|
| 5,528,518 A | 6/1996 | Bradshaw et al. |
| 5,539,665 A | 7/1996 | Lamming et al. |
| 5,553,312 A | 9/1996 | Gattey et al. |
| 5,553,620 A | 9/1996 | Snider et al. |
| 5,555,354 A | 9/1996 | Strasnick et al. |
| 5,561,841 A | 10/1996 | Markus |
| 5,564,070 A | 10/1996 | Want et al. |
| 5,586,254 A | 12/1996 | Kondo |
| 5,594,946 A | 1/1997 | Menich et al. |
| 5,598,532 A | 1/1997 | Liron |
| 5,625,827 A | 4/1997 | Krause et al. |
| 5,627,879 A * | 5/1997 | Russell et al. .............. 370/328 |
| 5,636,344 A | 6/1997 | Lewis |
| 5,689,355 A | 11/1997 | Okubo et al. |
| 5,710,758 A | 1/1998 | Soliman et al. |
| 5,755,072 A | 5/1998 | Lingafelter |
| 5,761,093 A | 6/1998 | Urbish et al. |
| 5,774,669 A | 6/1998 | George et al. |
| 5,794,128 A | 8/1998 | Brockel et al. |
| 5,799,154 A | 8/1998 | Kuriyan |
| 5,802,146 A | 9/1998 | Dulman |
| 5,809,282 A | 9/1998 | Cooper et al. |
| 5,815,395 A | 9/1998 | Hart et al. |
| 5,821,937 A | 10/1998 | Tonelli et al. |
| 5,825,759 A | 10/1998 | Liu |
| 5,828,960 A | 10/1998 | Tang et al. |
| 5,831,610 A | 11/1998 | Tonelli et al. |
| 5,832,389 A | 11/1998 | Dent |
| 5,845,124 A | 12/1998 | Berman |
| 5,859,838 A * | 1/1999 | Soliman .................... 370/249 |
| 5,861,887 A | 1/1999 | Butler et al. |
| 5,867,112 A | 2/1999 | Kost |
| 5,877,777 A | 3/1999 | Colwell |
| 5,878,328 A | 3/1999 | Chawla et al. |
| 5,907,850 A | 5/1999 | Krause et al. |
| 5,917,808 A | 6/1999 | Kosbab |
| 5,920,607 A * | 7/1999 | Berg ........................ 379/1.01 |
| 5,923,850 A | 7/1999 | Barroux |
| 5,926,762 A | 7/1999 | Arpee et al. |
| 5,940,196 A | 8/1999 | Piehler et al. |
| 5,945,976 A | 8/1999 | Iwamura et al. |
| 5,948,055 A | 9/1999 | Pulsipher et al. |
| 5,949,335 A | 9/1999 | Maynard |
| 5,949,988 A | 9/1999 | Feisullin et al. |
| 5,953,669 A | 9/1999 | Stratis et al. |
| 5,963,867 A | 10/1999 | Reynolds et al. |
| 5,970,406 A | 10/1999 | Komara |
| 5,977,851 A | 11/1999 | Stancil et al. |
| 5,987,328 A | 11/1999 | Ephremides et al. |
| 5,994,984 A | 11/1999 | Stancil et al. |
| 6,002,941 A * | 12/1999 | Ablay et al. ................ 455/518 |
| 6,006,021 A | 12/1999 | Tognazzini |
| 6,018,625 A | 1/2000 | Hayball et al. |
| 6,021,316 A | 2/2000 | Heiska et al. |
| 6,032,105 A | 2/2000 | Lee et al. |
| 6,038,547 A | 3/2000 | Casto |
| 6,044,273 A | 3/2000 | Tekinay |
| 6,058,102 A | 5/2000 | Drysdale et al. |
| 6,058,262 A | 5/2000 | Kawas et al. |
| 6,059,842 A | 5/2000 | Dumarot et al. |
| 6,061,722 A | 5/2000 | Lipa et al. |
| 6,075,541 A | 6/2000 | Maclinovsky |
| 6,084,168 A * | 7/2000 | Sitrick ...................... 84/477 R |
| 6,085,335 A | 7/2000 | Djoko et al. |
| 6,088,522 A | 7/2000 | Lee et al. |
| 6,091,362 A * | 7/2000 | Stilp et al. .................. 342/465 |
| 6,104,699 A | 8/2000 | Holender et al. |
| 6,108,309 A | 8/2000 | Cohoe et al. |
| 6,111,857 A | 8/2000 | Soliman et al. |
| 6,122,083 A | 9/2000 | Ohta et al. |
| 6,148,010 A | 11/2000 | Sutton et al. |
| 6,199,032 B1 * | 3/2001 | Anderson ..................... 703/21 |
| 6,204,813 B1 | 3/2001 | Wadell et al. |
| 6,208,833 B1 | 3/2001 | Preschutti et al. |
| 6,229,540 B1 | 5/2001 | Tonelli et al. |
| 6,243,772 B1 | 6/2001 | Ghori et al. |
| 6,253,086 B1 | 6/2001 | Parantainen et al. |
| 6,285,377 B1 | 9/2001 | Greenbaum et al. |
| 6,289,203 B1 | 9/2001 | Smith et al. |
| 6,311,144 B1 | 10/2001 | Abu El Ata |
| 6,317,599 B1 * | 11/2001 | Rappaport et al. .......... 455/446 |
| 6,326,987 B1 | 12/2001 | Alexander |
| 6,330,005 B1 | 12/2001 | Tonelli et al. |
| 6,331,836 B1 * | 12/2001 | Jandrell ................. 342/357.12 |
| 6,337,688 B1 | 1/2002 | Berstis |
| 6,338,031 B1 | 1/2002 | Lee et al. |
| 6,345,239 B1 * | 2/2002 | Bowman-Amuah ............ 703/6 |
| 6,356,758 B1 | 3/2002 | Almeida et al. |
| 6,393,432 B1 | 5/2002 | Flansburg et al. |
| 6,408,312 B1 | 6/2002 | Forthman et al. |
| 6,442,507 B1 | 8/2002 | Skidmore et al. |
| 6,470,195 B1 | 10/2002 | Meyer |
| 6,487,417 B1 | 11/2002 | Rossoni et al. |
| 6,493,679 B1 * | 12/2002 | Rappaport et al. ............ 705/29 |
| 6,496,290 B1 | 12/2002 | Lee |
| 6,499,006 B1 * | 12/2002 | Rappaport et al. ............ 703/20 |
| 6,505,045 B1 | 1/2003 | Hills et al. |

OTHER PUBLICATIONS

Newhall-W.G., "Wideband Propagation Measurement Results, Simulation Models, and Processing Techniques for s Sliding Correlator Measurement System", Dissertation. p. 1-159.*

Rappaport-T.S., "Last-Mile Wireless Propagation Modeling, Measurment, & Prediction" HP. 1998. p. 1-20.*

EDX Signal Pro. 1996. p. 1-13.*

EDX Data File Format Specifications. Jul. 2001 p. 1-24.*

Borst et al., "Wireless Simulation and Self-Organizing Spectrum Management" Bell Labs Technical Journal. 1997 p. 81-98.*

Cambridge Research Associates: "Synthetic Vision Systems" 1999 p. 1-31.*

Huang-Y.P., Triangular Irregular Network 1989 Computers-In-Industry. vol. 12, No. 3, p. 203-213.*

EDX, Mircocell/Indoor Module, Apr. 2000, p. 1-46.*

PCS 97 Track 7; Engineering & Systems Management; T. Rappaport p. 1-23.

Propagator; vol. 8, No. 3; Fall 1997.

SMT Plus 1.0 User's Manual; R. Skidmore & T. Rappaport; Copyright, Aug. 1996 Virginia Tech p. 1-23.

Software by Andrew titled "RF Planner" dated Jun. 17, 1997, 63 pg.

A user guide titled "Andrew Antenna System Planner" dated Jun. 1999, p. 63.

* cited by examiner

METHOD AND SYSTEM FOR MODELING AND MANAGING TERRAIN, BUILDINGS, AND INFRASTRUCTURE

CROSS-REFERENCE TO RELATED APPLICATIONS

This application claims priority under 35 U.S.C. § 120 to U.S. Provisional Patent Application Ser. No. 60/268,360 filed on Feb. 14, 2001.

This application is related to applications Ser. No. 09/318,841 now issued as U.S. Pat. No. 6,850,946, entitled "Method And System for a Building Database Manipulator," filed by T. S. Rappaport and R. R. Skidmore, Ser. No. 09/318,842 now issued as U.S. Pat. No. 6,493,679, entitled "Method and System for Managing a Real Time Bill of Materials," filed by T. S. Rappaport and R. R. Skidmore, Ser. No. 09/318,840 now issued as U.S. Pat. No. 6,317,599, entitled "Method and System For Automated Optimization of Communication component Position in 3D" filed by T. S. Rappaport and R. R. Skidmore, Ser. No. 09/633,122 now issued as U.S. Pat. No. 7,096,173, entitled "Method and System for Designing or Deploying a Communications Network which Allows Simultaneous Selection of Multiple Components" fled by T. S. Rappaport and R. R. Skidmore, Ser. No. 09/633,121 now issued as U.S. Pat. No. 6,625,454, entitled "Method and System for Designing or Deploying a Communications Network which Considers Frequency Dependent Effects" filed by T. S. Rappaport and R. R. Skidmore. Ser. No. 09/632,853, entitled "Method and System for Designing or Deploying a Communications Network which Considers Component Attributes" filed by T. S. Rappaport, R. R. Skidmore, and Eric Reifsnider, Ser. No. 09/633,120 now issued as U.S. Pat. No. 6,721,769, entitled "Improved Method and System for a Building Database Manipulator" filed by T. S. Rappaport and R. R. Skidmore, and Ser. No. 09/632,803, entitled "System and Method for Efficiently Visualizing and Comparing Communication Networks, System Performance" filed by T. S. Rappaport, R. R. Skidmore, and Brian Gold, and pending application Ser. No. 09/668,145, entitled "System and Method for Design, Tracking, Measurement, Prediction, and Optimization of Data Communication Networks" filed by T. S. Rappaport, R. R. Skidmore, and Ben Henry, the subject matter of which is incorporated herein by reference.

BACKGROUND OF THE INVENTION

1. Field of the Invention

The present invention generally relates to engineering and geographical information systems for the design and management of communications networks, and, more particularly, to a method for creating, using, and managing a three-dimensional (3-D) representation of the physical environment comprised of both terrain and building data.

2. Background Description

As wireless communications use increases, radio frequency (RF) coverage within and around buildings and signal penetration into buildings from outside transmitting sources has quickly become an important design issue for wireless engineers who must design and deploy cellular telephone systems, paging systems, or new wireless systems and technologies such as personal communication networks or wireless local area networks. Designers are frequently requested to determine if a radio transceiver location, or base station cell site can provide reliable service throughout an entire city, an office building, arena or campus. A common problem for wireless systems is inadequate coverage, or a "dead zone," in a specific location, such as a conference room. It is now understood that an indoor wireless PBX (private branch exchange) system or wireless local area network can be rendered useless by interference from nearby, similar systems. The costs of in-building and microcell devices which provide wireless coverage within a 2 kilometer radius are diminishing, and the workload for RF engineers and technicians to install these on-premises systems is increasing sharply. Rapid engineering design and deployment methods for microcell and in-building wireless systems are vital for cost-efficient build-out.

Analyzing radio signal coverage penetration and interference is of critical importance for a number of reasons. A design engineer must determine if an existing outdoor large-scale wireless system, or macrocell, will provide sufficient coverage throughout a building, or group of buildings (i.e., a campus). Alternatively, wireless engineers must determine whether local area coverage will be adequately supplemented by other existing macrocells, or whether indoor wireless transceivers, or pieocells, must be added. The placement of these cells is critical from both a cost and performance standpoint. If an indoor wireless system is being planned that interferes with signals from an outdoor macrocell, the design engineer must predict how much interference can be expected and where it will manifest itself within the building, or group of buildings. Also, providing a wireless system that minimizes equipment infrastructure cost as well as installation cost is of significant economic importance. In addition, after a system or network is installed, there is continued need to manage the installed network over time and space, to record and continually edit and modify the maintenance records of the system as well as track the cost, maintenance repairs, and ongoing performance of the system and the components that make up the system, so that on-going operational data may be gathered, understood, aggregated and used for further build-out of systems. As in-building and microcell wireless systems proliferate, these issues must be resolved quickly, easily, and inexpensively, in a systematic, standardized, and repeatable manner.

There are many computer aided design (CAD) products on the market that can be used to design the environment used in one's place of business or campus. AutoCAD and AutoCAD Map from Autodesk, Inc., MapInfo from MapInfo, Inc., ArcView from ArcInfo, and Smallworld from General Electric are examples of powerful CAD and geographic information system (GIS) software packages designed to model and represent physical environments. However, none of the preceding tools provide an automated means of generating a seamlessly integrated, three-dimensional digital representation of a physical environment that combines terrain, buildings, and the internal structure of the buildings. Similarly, WiSE from Lucent Technology, Inc., SignalPro from EDX, PLAnet by Mobile Systems International, Inc. (now Marconi Ltd.), Celplan tom Celplan Technologies, Inc, Wizard by Agilent Technologies, Asset by Aircom, and TEMS and TEMS Light from Ericsson are examples of wireless CAD products used to assist wireless engineers in the design and deployment of wireless communication systems.

In practice, however, many pre-existing building or campus databases are designed only on paper, or are represented as photographs or bitmap images, as a database of parameters defining the environment does not readily exist. Only recently has it been possible to acquire very accurate data regarding the physical characteristics of terrain along with detailed information on building positions and geometry. It has been difficult, if not generally impossible, to gather this disparate information and manipulate the data for the purposes of planning and implementation of indoor and outdoor RF wireless communication systems, and each new environment requires tedious manual data formatting in order to run with computer generated wireless prediction models.

Illustrative of the state of the art in the creation of accurate, efficient three-dimensional digital models of terrain and buildings for the purpose of site-specific propagation modeling or system design are several patents directed at related subject matter to the present invention. These include U.S. Pat. No. 5,491,644 to Pickering et al., U.S. Pat. No. 5,561,841 to Markus, U.S. Pat. No. 5,987,328 to Ephremides and Stamatelos, U.S. Pat. No. 5,794,128 to Brockel, et al., U.S. Pat. No. 6,111,857 to Soliman et al., U.S. Pat. No. 5,625,827 to Krause, et. al., U.S. Pat. No. 5,949,988 to Feisullin et al., U.S. Pat. No. 5,598,532 to Liron, U.S. Pat. No. 5,953,669 to Stratis et. al. and U.S. Pat. No. 6,044,273 to Tekinay. The above listed patents teach various methods and systems for the simulation of wireless communication systems utilizing, in some fashion, information regarding the physical environment in which the communication systems are positioned. They do not, however, teach any type of asset management which combines site-specific environment models with models of the actual installed equipment infrastructure, nor do they provide any information as to the specific format of the digital model of the physical environment or any indication of how the digital model was constructed.

Other patents that deal with asset management and which allow the current invention include U.S. Pat. No. 6,047,321 to Raab, U.S. Pat. No. 6,058,397 to Barrus, et. al., U.S. Pat, No. 6,067,030 to Burnett, et al., U.S. Pat. No, 6,223,137 to McKay, U.S. Pat. No. 5,523,747 to Wise, and U.S. Pat. No. 6,006,171 to Vines. A survey of the state-of-the-art in the use of maps and geographic information for telecommunications asset management can be found in "GIS in Telecommunications" published in May 2001 by ESRI Press of Redlands, Calif. None of the above-referenced patents or publications contemplates the systematic creation or display, through the use of a set of rules or algorithms, of a three-dimensional digital model of the physical environment that may include outdoor environments, indoor environments, and underground environments in a seamless fashion. Furthermore, none of the above cited references contemplate combining three-dimensional digital models of internal building structures with three-dimensional models of outdoor terrain and building geometries into a database format that also includes site-specific component layout information of an actual physical distributed network.

Furthermore, the above cited references do not teach an asset management method or system that allows a site-specific database model to include a site-specific representation of a distributed network of components, such that the actual physical network of components being modeled may also be accounted for, maintained, monitored for performance or alarms, and subsequently managed in an interactive manner on a component-by-component basis or system wide basis using a common database format. While the above cited patents show the difficulty in obtaining such models for city environments, they do not suggest a systematic, repeatable and fast methodology or algorithmic approach for creating a three-dimensional model of a physical environment that combines both terrain and buildings (or other objects such as trees, natural or man made objects, towers, partitions, walls, and the like) such that the completed representation may be stored and viewed in a vector format that is optimal for the purposes of planning and deploying and tracking maintenance and cost records as well as on-going performance data of wireless communication equipment, computer network equipment, or any form of structured cabling network, or distributed network of components within a model that represents the actual physical environment.

SUMMARY OF THE INVENTION

It is therefore an object of the present invention to provide a rapid and automated method and system for generating a highly accurate, three-dimensional digital model of a physical environment, where the physical environment may include fluctuating terrain elevation and land-use characteristics, building geometries, positions, and heights, objects located in the vicinity of buildings, such as automobiles, trees, and people, and the internal layout of the walls, doors, ceilings, elevators, stairwells, windows, furniture, and equipment located within buildings. This unified method offers a significant value for communications engineers and provides a marked improvement over existing techniques.

Yet another object of the present invention is to provide an asset management system and method that is able to represent different physically distributed networks of communication components within a building, or from outside of a building to inside of a building, or within underground tunnels into a building or to the outside environment, by using the described database model so that ongoing storage and modification of cost, performance, prediction, maintenance, and ownership data pertaining to different modeled networks in different parts of the world may be handled and aggregated. This novel and valuable asset management system and method further allows the database model of a distributed network to interact with the actual physical network of components which are so modeled in order to determine performance and alarm events as well as system or network performance metrics that may be compared, stored, measured, visualized, displayed and aggregated to enhance the on-going management of distributed communication networks of an enterprise or global telecommunications carrier.

According to the invention, there is provided digital information regarding terrain elevation and land-use, building positions, tower positions, as well as geometries, height, and the internal layout of the walls, doors, ceilings, furniture, and other objects within buildings, where said digital information may be in separate data formats or presentations, including two- or three-dimensional raster or vector imagery, and are combined into a single, three-dimensional digital model of the physical environment. The resulting three-dimensional digital model combines all aspects of the physical environment contained within the separate pieces of information utilized, and is well suited for any form of display, analysis, or archival record of a wireless communication system, computer network system, or may also be used for civil utilities planning and maintenance purposes. For example, using the method of the present invention, engineers may create a single unified database that includes a model of the elevation of outdoor terrain and use environmental data simultaneously with building data such as ceiling and wall heights above the terrain or ground level, building wall locations, locations of windows, doors, and furniture, and the like. This type of unified database may be used for example, in the prediction of system or network performance of a wireless network designed to provide coverage to users both outside and inside of buildings, or to provide a mechanism for displaying the physical location of infrastructure assets, such as antennas, towers, coaxial cables, and amplifiers, inside and outside of buildings. Although the three-dimensional digital model constructed in the preferred embodiment of the invention is intended for use in the simulation of wireless or wired telecommunication system performance, it will be apparent to one skilled in the art how many other applications could utilize the three-dimensional digital model for other planning or presentation purposes.

For example, any type of distributed or fixed network of equipment (infrastructure equipment) that must be physically interconnected together indoors or between indoor and outdoor environments, such as air conditioning machinery and ducting, plumbing/pipes and equipment, or electrical conduction systems that incorporate transformers and wiring, may be modeled and managed using the present invention.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
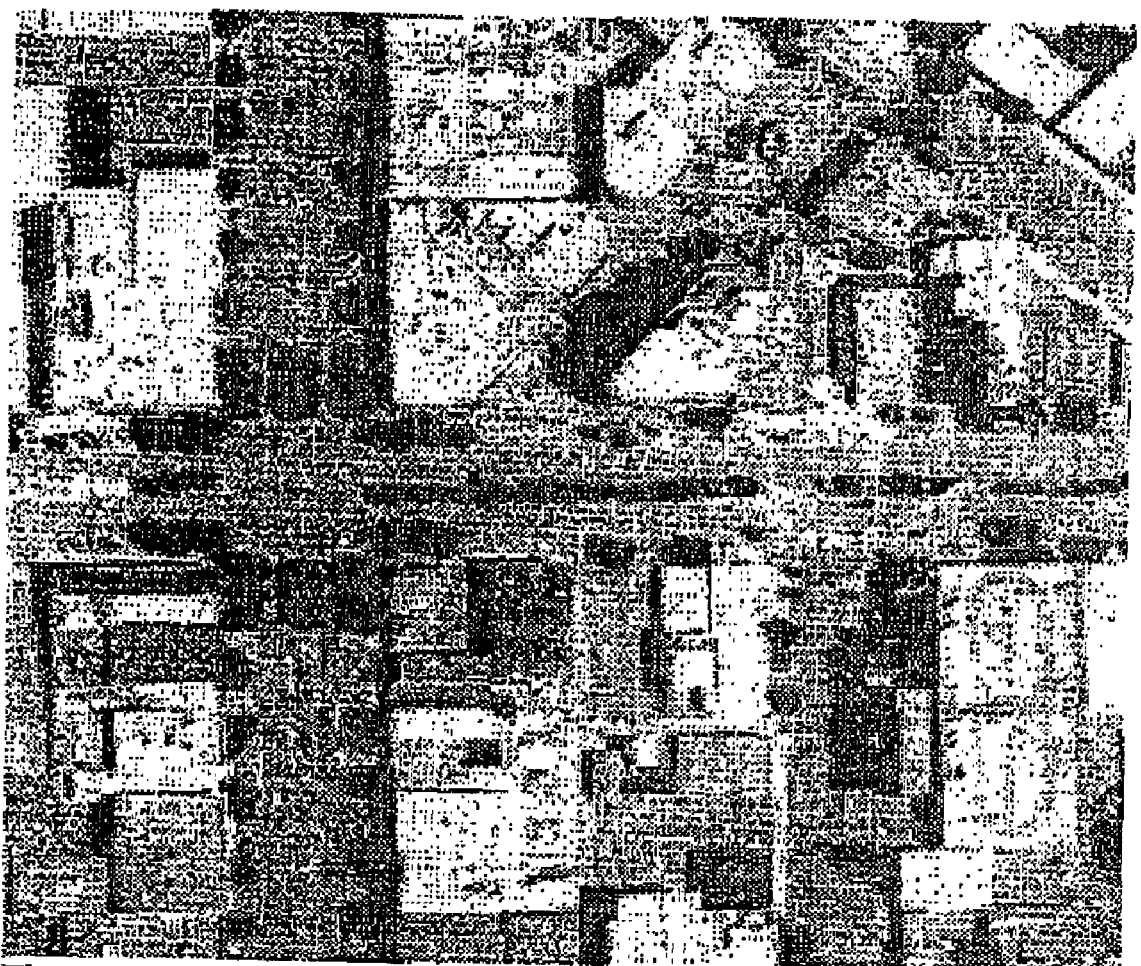
FIG. 1 is an example of Digital Ortho Imagery.

Referring now to the drawings there is shown a method for creating, using, and managing a three-dimensional digital model of the physical environment that combines outdoor terrain elevation and land-use information, building placements, heights, and geometries, and the interior structure of buildings such as walls, floors, windows, and doors. The resulting three-dimensional digital model represents a seamless integration of indoor and outdoor environments.

In order to perform highly accurate, location-specific simulations of wireless communication system performance, or to maintain site-specific records of equipment cost, installation cost, repair records or equipment replacement or service, or to monitor or track performance data of the network, or to keep an archived record of the site specific location of installed equipment over time and space, a very detailed description of the physical environment in three-dimensions is required. Until recently, high-resolution geographical data was not readily available, which made very detailed models of the physical environment extremely difficult to create, generally requiring great amounts of manual effort. With new advancements in the field of remote sensing and image process, high-resolution information is becoming available. This information is available from a number of commercial vendors, and is provided in several different data formats today. A brief description of the common formats found today is given below.

Historically, geographic information has been most readily available in the form of digital overhead imagery. There are two fundamentally different ways of representing images in a digital computer: raster and vector formats. A raster image provides a picture of the environment in the form of an ordered collection of colored dots referred to as pixels. The pixels are arranged in a two-dimensional grid in rows and columns. Each pixel is associated with a particular value, typically a color or intensity. When viewed as a whole, the grid of pixels with their varying colors and intensities form a pictorial representation of a physical environment. A typical example of a raster database is a bitmap (BMP) image, where the color of every point or pixel of the image is given. In the context of geographic information systems, raster images typically consist of pixels whose associated values represent elevation values. For example, a raster image representing downtown Manhattan could provide a grid of regularly-spaced pixels whose values correspond to the elevation above sea-level of the corresponding location in the real-world. In this case, the terrain is represented as a rectangular grid where the elevations of the vertices of the grid are given. A raster image of the terrain or of any physical environment can be obtained from the satellite images or from other aerial photographic techniques. Note that the raster images of a physical environment need not just have the elevation of the points; it might also have information about the soil characteristics, the population density, or any other land-use parameter. Examples of raster images common today include bitmaps (BMP), JPEG files (JPG), Tagged Information File Formats (TIFF), and Targa (TGA).

The term vector format is used here to mean the representation for a point in some logical space. In dealing with three-dimensional vector image formats, three spatial coordinate axes X, Y and Z are typically used to represent a point in space. The vector format specifies the boundaries of the physical region being represented. To represent lines, circles or other compound shapes, a vector format uses a sequence of points. For instance a line is usually specified with a starting point and an end point, where each point is an X, Y, Z triplet. Polygons and basic shapes may also be supported within vector image formats, and are typically specified as a set of vector corresponding to the vertices of the polygons. Many CAD software tools use vector file formats to represent a physical object or region. The vector format is usually more economical in storage when compared to raster image formats.

Information regarding a physical outdoor region is generally provided as either a raster or vector image format. To obtain this information, remote sensing methods are commonly employed. One of the earliest and the most popular remote sensing method is aerial photography. As technology progressed, remote sensing expanded from aerial photography to encompass imagery of the land surface collected by electronic sensors sensitive to a wider range of electromagnetic energy as well as sonar energy. With advancements in the field of remote sensing and image analysis, high-resolution data, which describes both the terrain and the buildings of a particular region, are now available.

The United States Geological Survey (USGS) produces high-resolution mapping data for land-use and terrain elevation, line graphics of major cartographic features and high-resolution photographic data. Apart from the USGS, there are many private vendors such as I-Cubed Inc. and EDX Corporation that provide information regarding terrain, buildings, and morphology data for many cities across the United States. An overview of popular data formats presently available through commercial sources is provided below.

Digital Ortho-Imagery, an example of which is given as FIG. 1, denotes an image of a city or an area obtained from either air photos or satellite imagery. This information is often used as a visual reference of the area under consideration.

Figure 2:
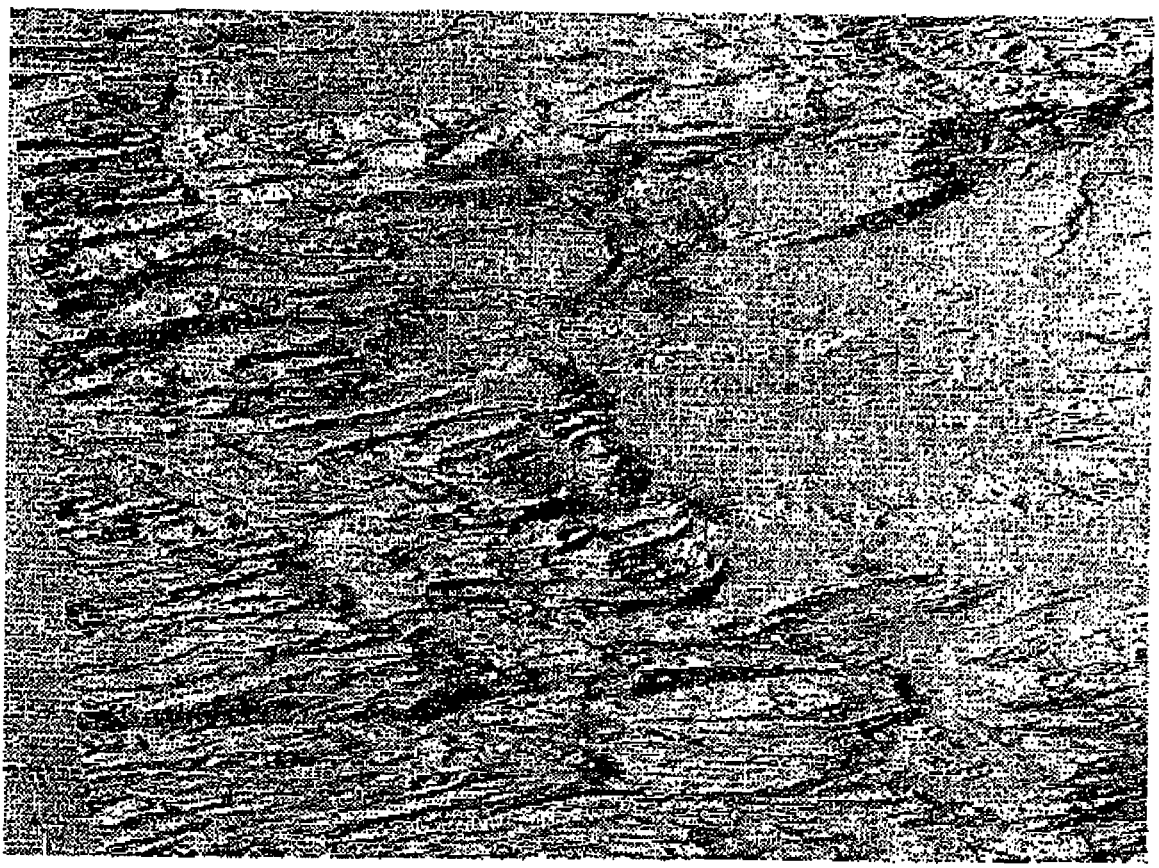
FIG. 2 is an example of a Digital Elevation Model image

The most popular data formats from the USGS are Digital Elevation Models DEMs). DEMs are raster file formats consisting of an array of pixels representing elevations for ground positions at regularly spaced intervals. The data is produced either from digitized cartographic map contour overlays or from scanned National Aerial Photography Program (NAPP) photographs, USGS DEMs are generally available in resolutions of 30 meters. The vertical resolution is often equal to 15 meters. The 30-meter data typically provides the elevation of a 2 dimensional array of data spaced 7.5 arc-minutes apart in latitude and longitude; hence, it is popularly known as 7.5 minute DEM. The USGS DEMs are usually used to represent the terrain characteristics of a particular region. However, DEMs with resolutions as low as 30 meters fail to capture all the building details and other man made or natural obstacles that might be required to plan a wireless network in a urban environment. Currently, DEMs with a resolution as fine as 10 meters are available for select regions. FIG. 2 shows a DEM with 10 m×10 m resolution of the Lake Tahoe region in California. The pixels with a higher gray scale value appear brighter and denote higher elevations; the pixels with lower gray scale values appear darker and denote lower altitudes.

Land Use and Land Cover (LULC) digital data is a raster data format produced by the USGS that is derived from thematic overlays registered to 1:250,000-scale base maps and a limited number of 1:100,000-sale base maps. LULC data provides information on urban or built-up land, agricultural land, rangeland, forestland, water, wetlands, barren land, tundra, and perennial snow or ice, said information typically being referred to as land-use data. Associated maps may display information in five data categories: political units, hydrologic units, census county subdivisions, Federal land ownership, and State land ownership. Land-use and other morphology data can be critical to the design of wireless communication system by providing details such as population density or mean income levels, etc.

Figure 3:
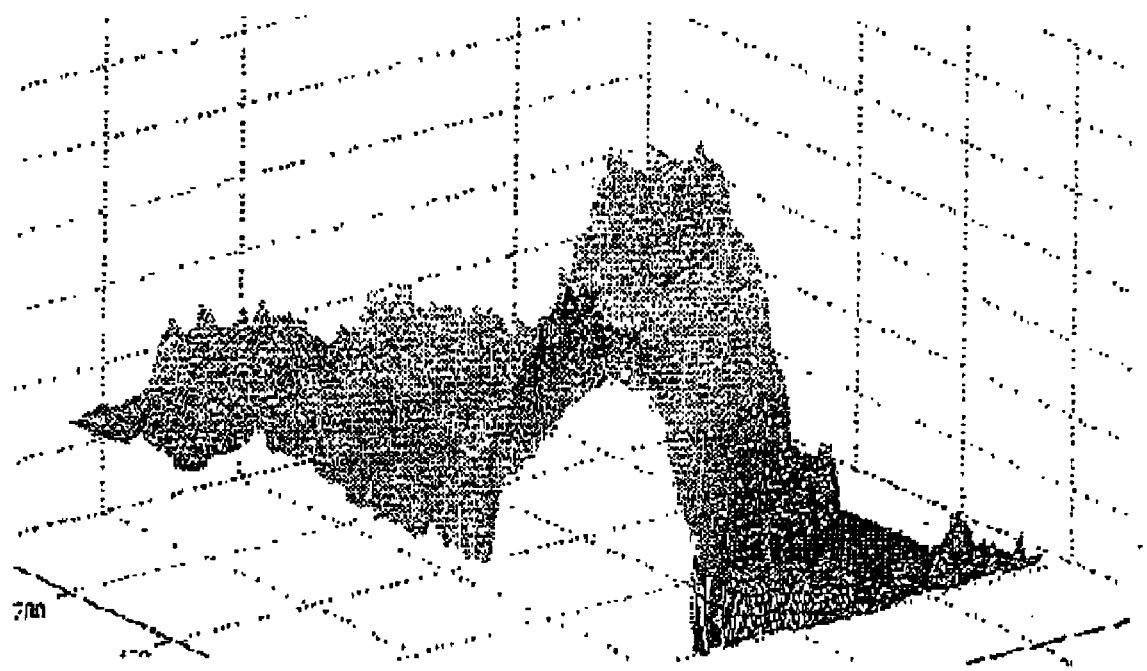
FIG. 3 is an example of a Canopy Digital Elevation Model image.

A Canopy DEM is a raster image that represents the elevation of a grid of a surface that can be visualized as if a thin blanket was draped over the region. Canopy DEMs consist of a array of elevations at regularly spaced intervals. It includes elevation data for such terrain objects as trees, buildings, and the surface of the ground. Canopy DEMs are developed from aerial photographs using automated photogrammetry techniques. High-resolution canopy DEMs with resolution as fine as 1 m×1 m are available for many cities throughout the United States. Canopy DEMs can be used to model the terrain and the buildings for a ray tracing based prediction technique where an accurate model of the physical environment is required. However, Canopy DEMs do not differentiate between the different obstructions in the environment. For example, Canopy DEMs do not differentiate between hills, trees, or buildings; all obstructions and physical characteristics of the environment are modeled in terms of an elevation. FIG. 3 shows a cross section of a Canopy DEM of downtown Chicago.

Figure 4:
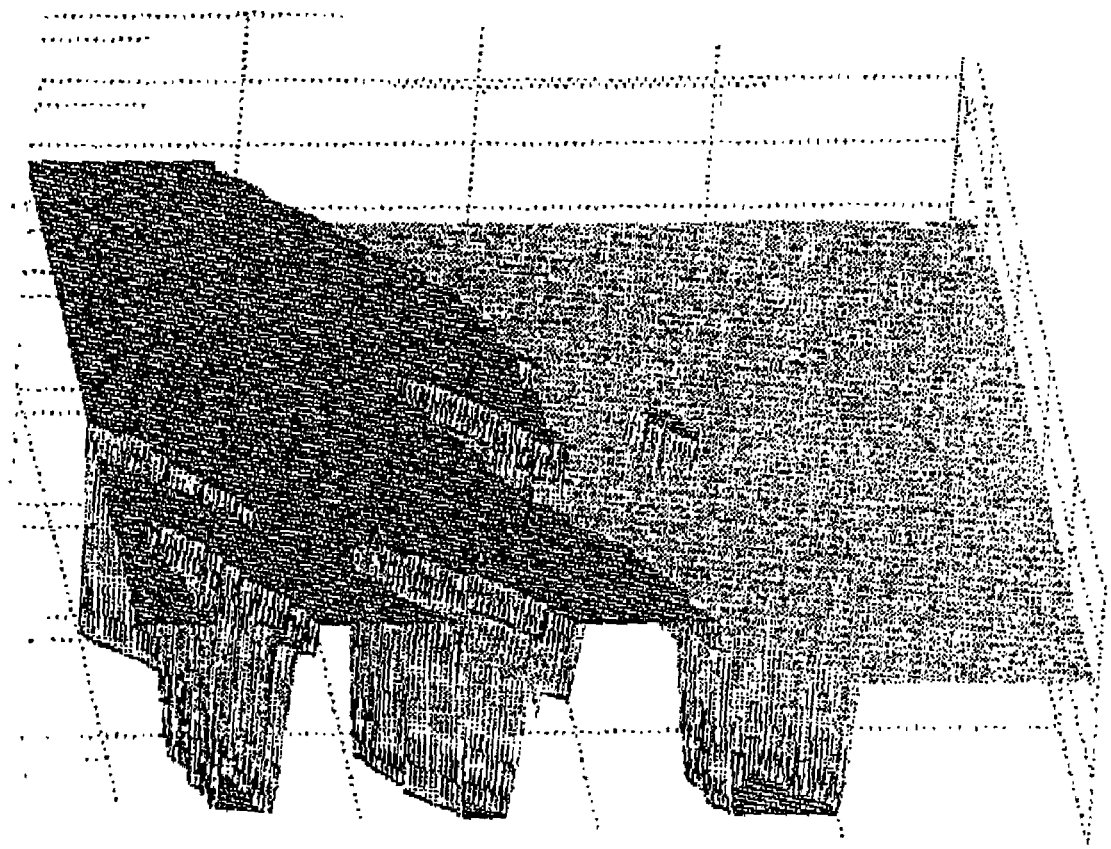
FIG. 4 is an example of a Bald Earth Digital Elevation Model image.

Bald Earth DEMs are raster image formats similar to Canopy DEMs with the exception that Bald Earth DEMs do not include the elevation of trees, buildings, or other non-terrain features. Bald Earth DEMs are created manually by combining Canopy DEMs and ground survey data. The low elevation points from the Canopy DEM are captured and interpolated to find the elevation of the terrain exclusive of buildings, trees, or other obstacles. Bald Earth DEMs are used in the present invention as a reference to define the height of buildings relative to the local ground surface, as described later. Bald earth DEMs with a resolution of 1 m×1 m×1 m are currently available. FIG. 4 provides an example Bald Earth DEM of a region of downtown Chicago.

Figure 5:
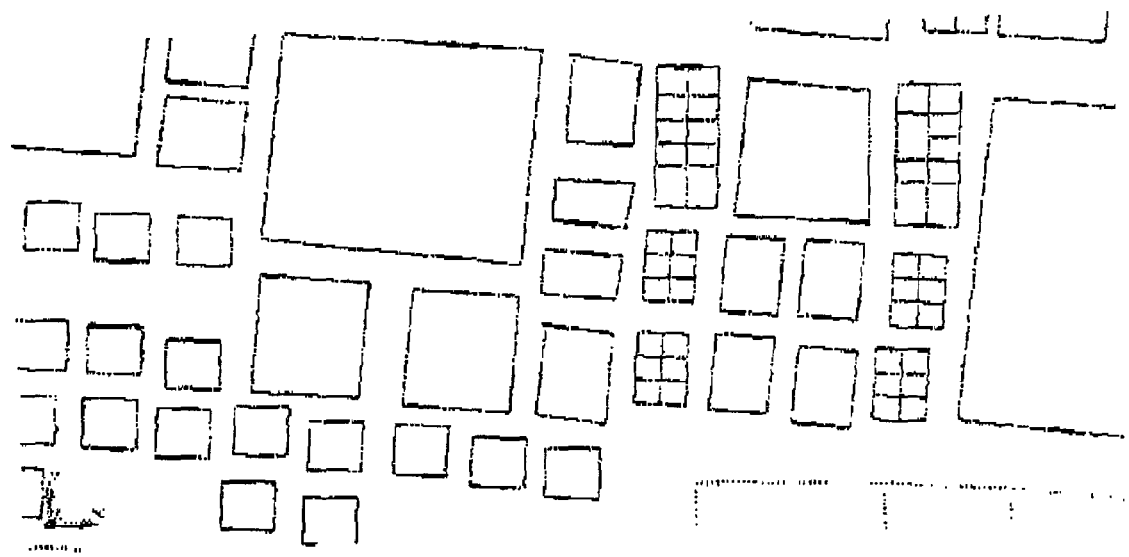
FIG. 5 is an example of a building footprint image.

Building Footprint and Top-print imagery is available in both raster and vector image formats and provides a representation of the outer edge of the exterior walls of the buildings in a given geographic area. The outer edge of the exterior wall at the base of the building is known as the building footprint, while the outer edge of the exterior wall at the top of the building is known as the top-print. Each building footprint and top-print is represented as a polygon, and the coordinates of the vertices or edges of the polygons are stored. The building footprint image information is developed by manually combining ground survey measurements and Canopy DEMs. The present invention utilizes Building Footprint and Top-print information in vector file format to develop the three-dimensional representation of the physical environment, as described later. FIG. 5 provides an example Building Footprint image.

Figure 6:
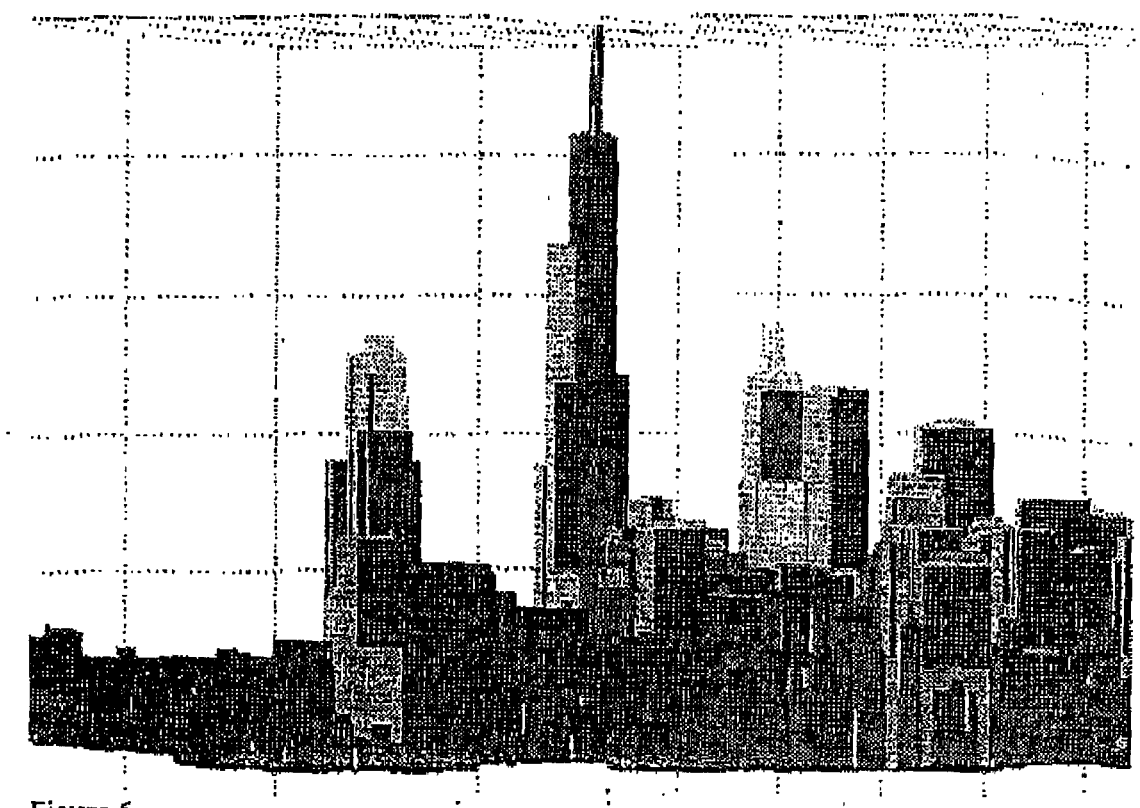
FIG. 6 is an example of a flooded Engineering Digital Elevation Model image.

Flooded Engineering DEMs integrate the fine detail of the building heights with the broad area coverage of Bald Earth DEMs. The elevations of the buildings are added to the terrain elevation of the Bald Earth DEM to obtain the Flooded Engineering DEM. The elevations of the buildings are obtained by manually combining the building foot print information and the Canopy DEM. The flooded Engineering DEMs do not include many other obstacles such as trees and other vegetation growth. Flooded Engineering DEMs with a resolution of 1 m×1 m×1 m are currently available, and an example is provided in FIG. 6.

Figure 7:
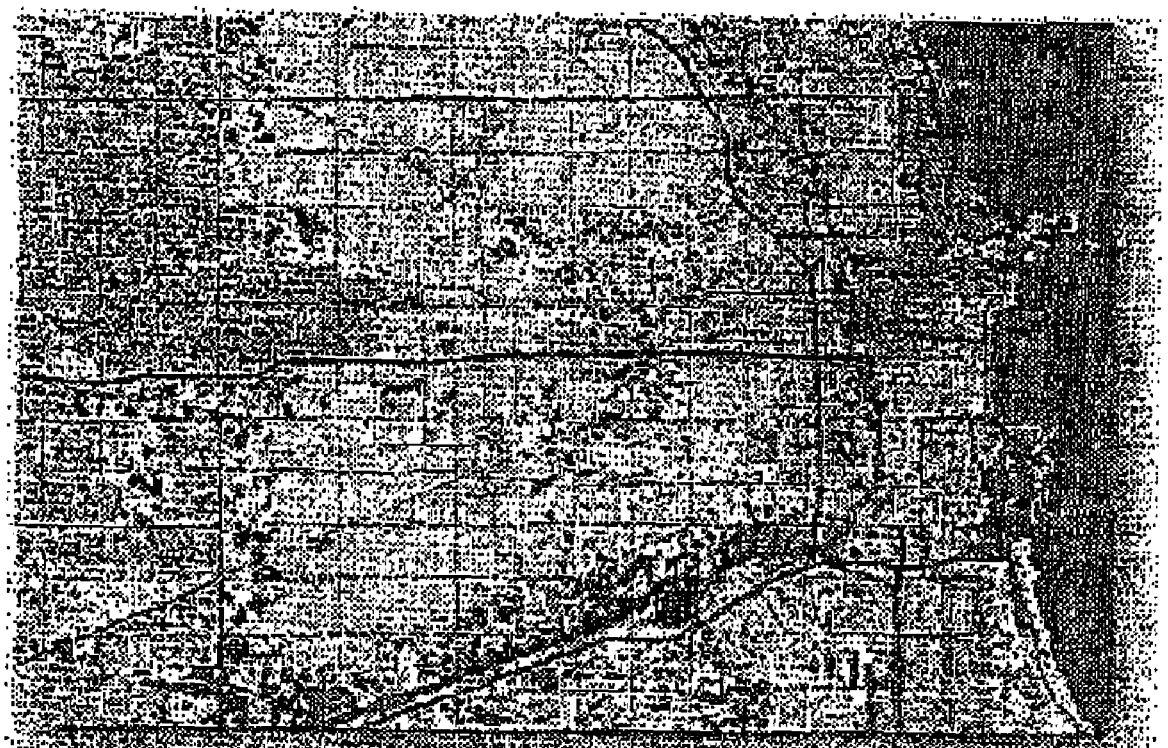
FIG. 7 is an example of a clutter map image.

Clutter Maps are vector image formats that can be used for wireless communication system planning. Clutter Maps denote the land activity or the density of the buildings at a particular area. The Clutter Map divides the area into different layers, each with different building densities and land activities. Some propagation prediction tools use clutter data along with the terrain information to characterize the environment. In some cases where the cost of high-resolution database is not justifiable, the Clutter Map can provide the sufficient information for propagation prediction. An example Clutter Map image is given in FIG. 7.

The layout of the three-dimensional internal structure of most buildings is not readily available today. However, recent inventions detailed in pending application Ser. No. 09/318,841, entitled "Method And System for a Building Database Manipulator," filed by T. S. Rappaport and R. R. Skidmore specify a system and method for creating a three-dimensional model of the internal structure of a building. The description provided within that application is hereby incorporated by reference.

The present invention provides a method and system for combining information regarding terrain, buildings, and the internal structure of one or more buildings and from across a variety of formats, some of which are listed above, into a single, composite, three-dimensional digital format. This process encompasses separately reading and processing information regarding the terrain, buildings, and internal structure of buildings, converting the information into a three-dimensional vector format, and then merging them into a single digital format.

Figure 8:
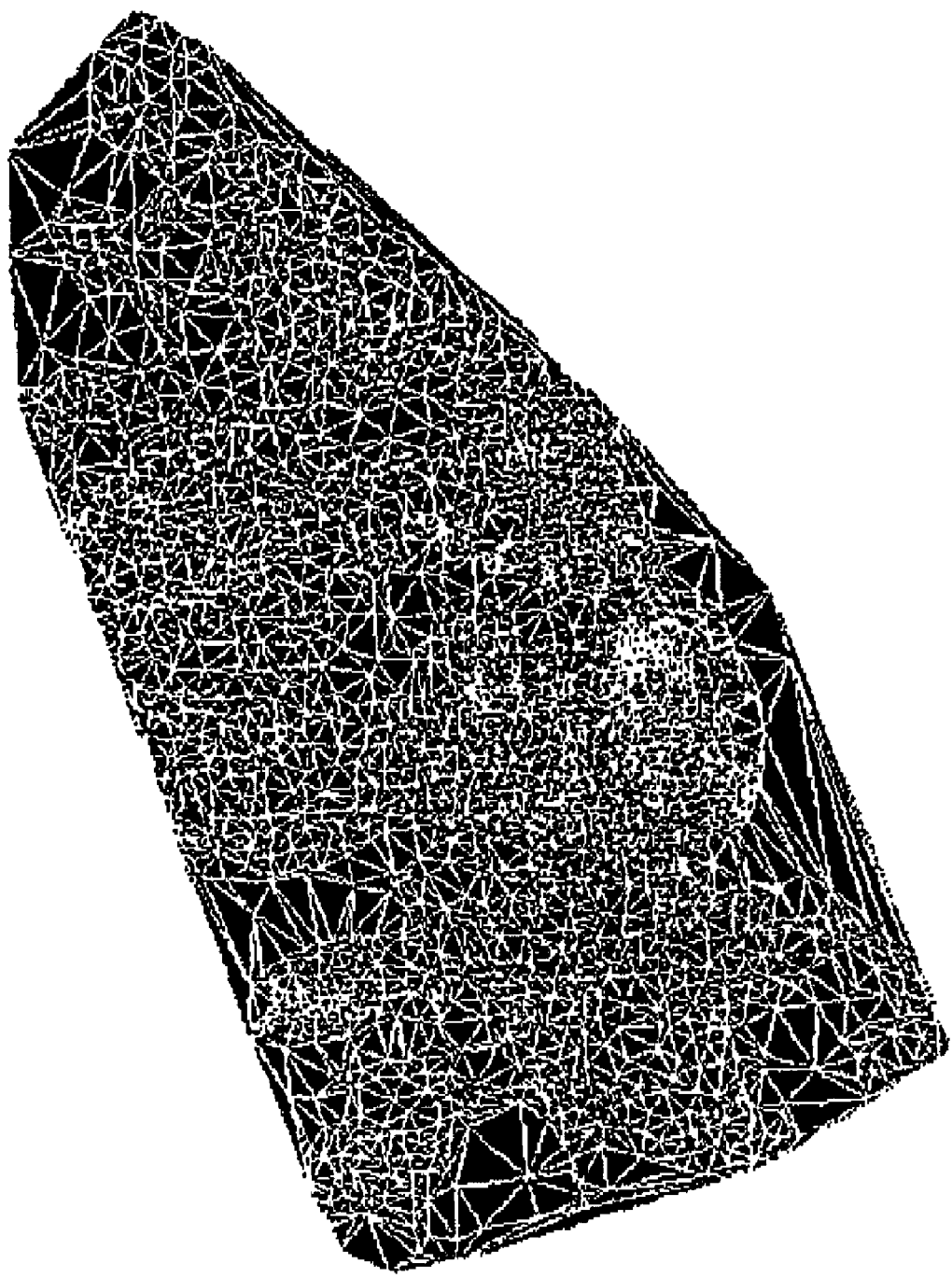
FIG. 8 is an example of a Triangular Irregular Network image.

The present invention utilizes a vector image format known as Triangular Irregular Network (TIN), illustrated in FIG. 8, to represent terrain features. A TIN, for the purposes of modeling terrain, is a collection of adjoining triangles whose vortices represent the elevation of the terrain within a given geographic area. The TIN format is automatically created by the invention through specialized process techniques applied to one or more of the various raster file formats described above. There are various algorithms for creating a TIN that are relevant to the present invention.

The TIN model was developed in the early 1970's as a simple way to build a surface from a set of irregularly spaced points. The Triangulated Irregular Network (TIN) model of the terrain would consist of a non-overlapping network of planar triangular polygons based on irregularly spaced nodes. The irregularly spaced node refers to the fact that no three nodes in the TIN model are collinear. The planar face of each triangle in the TIN forms a representation of the surface of the terrain at that location, and, in the context of wireless communication system performance prediction, provides a representation of the physical obstruction caused by fluctuation terrain elevations.

The TIN is a vector topological structure since only the set of nodes and the set of straight lines interconnecting the nodes need be stored. The TIN implementation can be made efficient by placing more nodes in the areas of rough terrain and fewer nodes in smoother terrain areas. The areas with relatively flat terrain can be modeled by using large triangles and rough terrain can be modeled using smaller triangles. This makes the TIN model very efficient in terms of the size of the database. As the number of surfaces that need to be modeled to represent the terrain decreases, the computational complexity of the wireless communication system performance prediction model also decreases drastically as there are fewer obstacles to consider in the simulation. Therefore, the TIN model is considered as a very good candidate for modeling the terrain for the site-specific propagation prediction software.

Unlike the DEM images, which are readily available from different vendors, terrain data is not readily available in the form of a TIN such that the DEM has to be converted into the TIN format. There are a number of different techniques for converting a DEM image into a TIN format.

A straightforward method to convert the DEM into a TIN is to use all the points in the DEM as nodes of a TIN and connect the all the nodes with its two neighbors to form a network of triangles. However, such an implementation would result in a large number of triangular surfaces in the TIN. For efficient performance of prediction software the number of surfaces used to model the environment needs to be kept to a minimum. To decrease the number of surfaces used to model the terrain, the uninteresting (non-critical) points of the DEM need to be filtered out and only the interesting points should be used to develop the TIN.

Several different algorithms for converting a DEM into a TIN presently exist. Most of the algorithms use a common approach while developing the TIN model from the DEMs. First, a few "significant" points of the DEM are identified. "Significant" refers to those points that are most useful in describing the surface and bringing out its salient topological features, such as sharp variations. These points are then triangulated using triangulation algorithms to make the TIN model of the terrain. A relatively recent approach integrates the point selection and the triangulation algorithm. Several algorithms have been proposed for selecting the "significant" points from the DEM with minimal loss of information regarding the terrain. These methods differ in the criteria used to select the points in the DEM. Some of these methods are used in popular terrain mapping software.

According to the Fowler and Little algorithm, which is known to those having ordinary skill in the art, only the points that represent significant characteristics of the terrain such as peaks, pits, ridge lines and channel lines are chosen from the DEM. The TIN is created by connecting these sets of points using triangulation algorithms. The Fowler and Little algorithm only suits certain types of landscapes, however, working especially well for landscapes with many sharp breaks of slopes, ridges, and sharp channels.

The Very Important Points (VIP) algorithm uses a different criterion to determine whether the point has to be ignored or retained from the DEM while constructing a TIN. The VIP algorithm assigns a certain "measure of significance" to all the points in the DEM, based on the difference in elevation of the pixels with its neighbors. All points with a "measure of significance" below a certain threshold are ignored while triangulating the DEM. The VIP process gives a more accurate representation of the terrain when compared to the Fowler and Little algorithm.

In both cases, the VIP and Fowler and Little algorithms filter out points in the DEM image that represent only the significant features of the terrain. These points, once selects are connected together to form a set of planar triangular surfaces to represent the terrain in the TIN. There are several approaches to performing this triangulation. Triangulation algorithms differ from each other in the number of triangles created for a given set of points, the quality of the triangles (whether they are short and fat or long slivery) and the computational complexity of the algorithm. The Delaunay Triangulation algorithm and the Radial Sweep Algorithm (RSA) are the two most widely used triangulation algorithms.

A combination the VIP or Fowler and Little algorithm with the Delaunay Triangulation or RSA algorithm may be used to generate a TIN from a DEM raster image. Another approach used for the extraction of a TIN from a raster database is that of integrating the point selection and triangulation method. Yet another method integrates the point selection algorithm with the Delaunay triangulation algorithm to form a TIN.

The Hierarchical Triangulation method was proposed as a generic method to model 3-D surfaces from a 3-D raster database. This method can easily be adapted to model the terrain. The hierarchical triangulation method uses a hierarchical structure based on nested triangles for triangulation. The triangles are hierarchically subdivided into nested triangles in such a way that the maximum error of the DEM is minimized at each stage. This algorithm allows the user to model a surface for any desired maximum error, and represents a second approach to generating a TIN format given a DEM raster image.

Yet another method to convert a DEM into a TIN is by iteratively using the Delaunay Triangulation algorithm along with the picking of the points from the DEM. This method has the advantages of the Delaunay triangulation algorithm and the integrated point selection method that allows the user to develop a TIN representation with a given maximum error. A user who needs only a rough approximation of the terrain can choose a large value as the maximum error. This would make the number of surfaces used to represent the terrain a minimum. To get a more accurate representation of the triangle, the user can choose a very low value as the maximum error and model the terrain accordingly.

Figure 9:
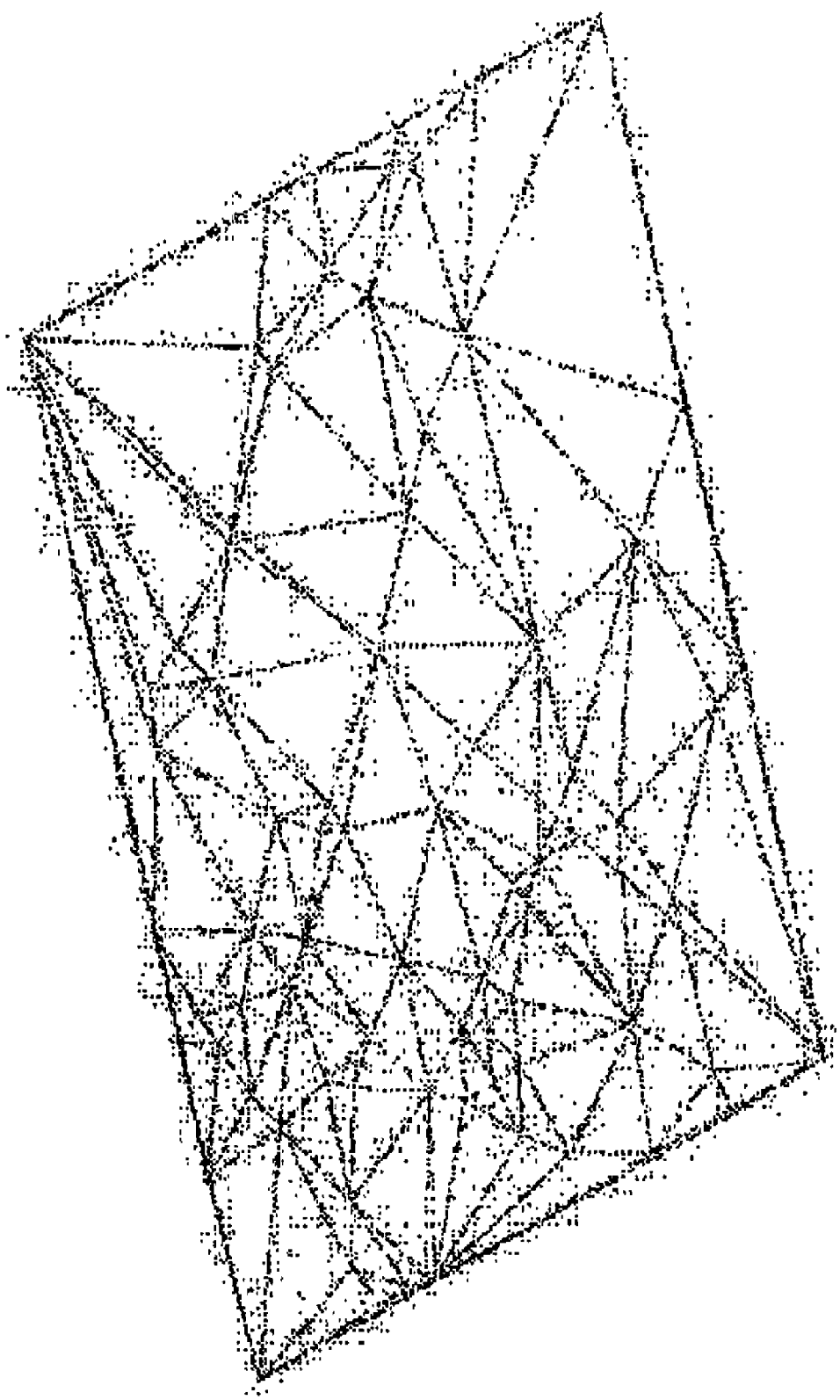
FIG. 9 is an example of a Triangular Irregular Network output.

The present invention incorporates all of the above techniques for creating a TIN to enable the conversion of any of the list DEM raster image formats into a three-dimensional vector format consisting of a finite set of planar, triangular surfaces whose vertices correspond to the elevations of select X,Y or longitude-latitude coordinates within the physical region being represented. FIG. 9 provides an example of a TIN image for a given geographical area. One skilled in the art will see how other techniques not listed here could also be applied in order to create a TIN representation of the physical environment.

The present invention also incorporates the ability to extrapolate a three-dimensional representation of building geometries from the various raster and vector file formats presented previously. The resulting three-dimensional representation of the buildings is a vector file format containing a collection of planar rectangular surfaces. The surface of each rectangular plane corresponds to the exterior wall of a building, building rooftops, one or more trees, obstacles in the environment, or any other physical object or obstruction in the environment that is not directly part of the terrain.

Buildings can be modeled as convex polygons comprised on individual plan panels. Until recently, the availability of high-resolution geographic data prevented highly accurate three-dimensional modeling of buildings. However, with the availability of new geographic products such as building top-prints and building footprints as described above, accurate modeling of a three-dimensional building database for an urban or a suburban environment can be achieved.

Figure 10:
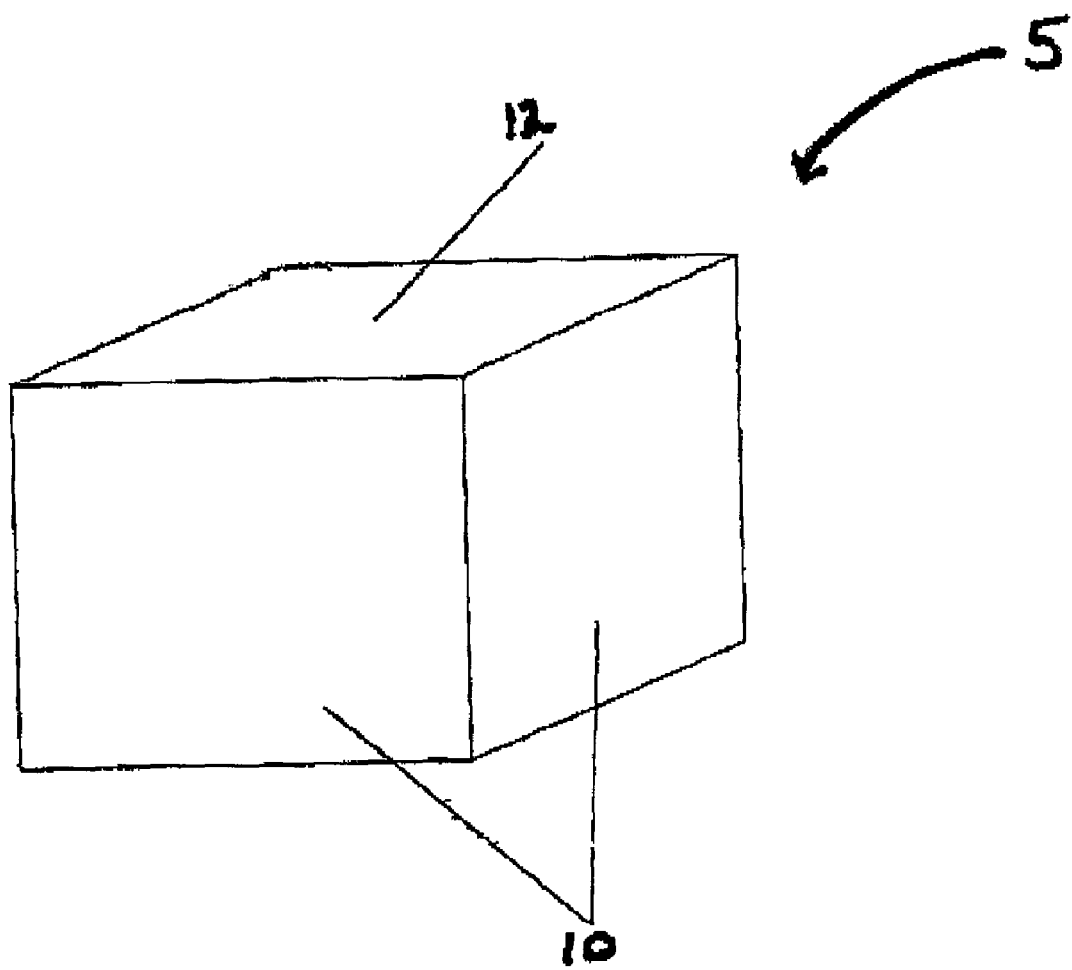
FIG. 10 is a three-dimensional representation of a building according to the present invention.

Building Top-prints in vector image format are commercially available today. Different venders provide Building Top-print vector data in a variety of formats, as there does not exist any well accepted standard, but most share similar characteristics. The different buildings in the building top-prints are generally indexed within the vector file format using a unique building number. Each building rooftop, in turn has its own unique rooftop index number associated with it. Information regarding the mapping of the rooftop index numbers to the building index numbers is generally stored in a separate file. The building rooftops are typically modeled as horizontal polygons with the X and Y coordinates stored in an anti-clockwise direction. The elevations of each of the roof top polygons as measured from the sea level are typically stored along with ceiling information. The rooftop polygons can have any number of sides according to the shape of the building being modeled. For example, consider a cubic building 5 with four vertical walls 10 and a horizontal roof 12 as shown in FIG. 10. For such a building, the top-print of the building would have the X and Y coordinates of the roof polygon 12 and the elevation of the rooftop polygon 12 above sea level stored along with the rooftop information. Note that the building top-print information does not include any information regarding the vertical walls 10 of the building, which have to be modeled separately. As described subsequently, the present invention teaches and contemplates the merging of such vertical wall data, which might also be natural or made-made objects, with the top-print data.

Figure 11:
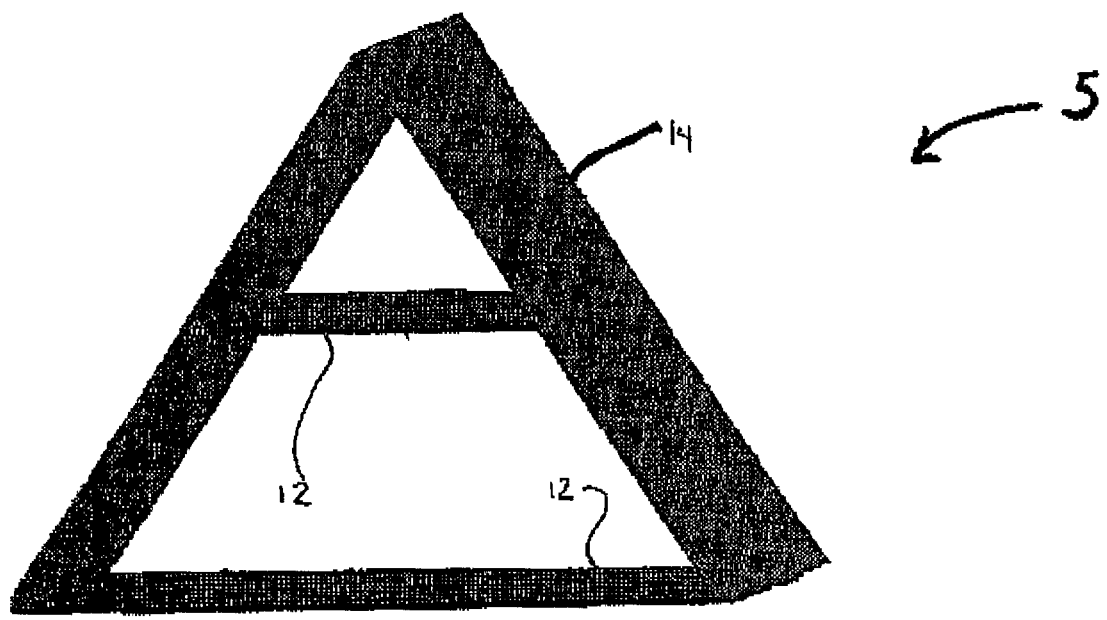
FIG. 11 is a model of a building with a sloped rooftop according to the present invention.
Figure 12:
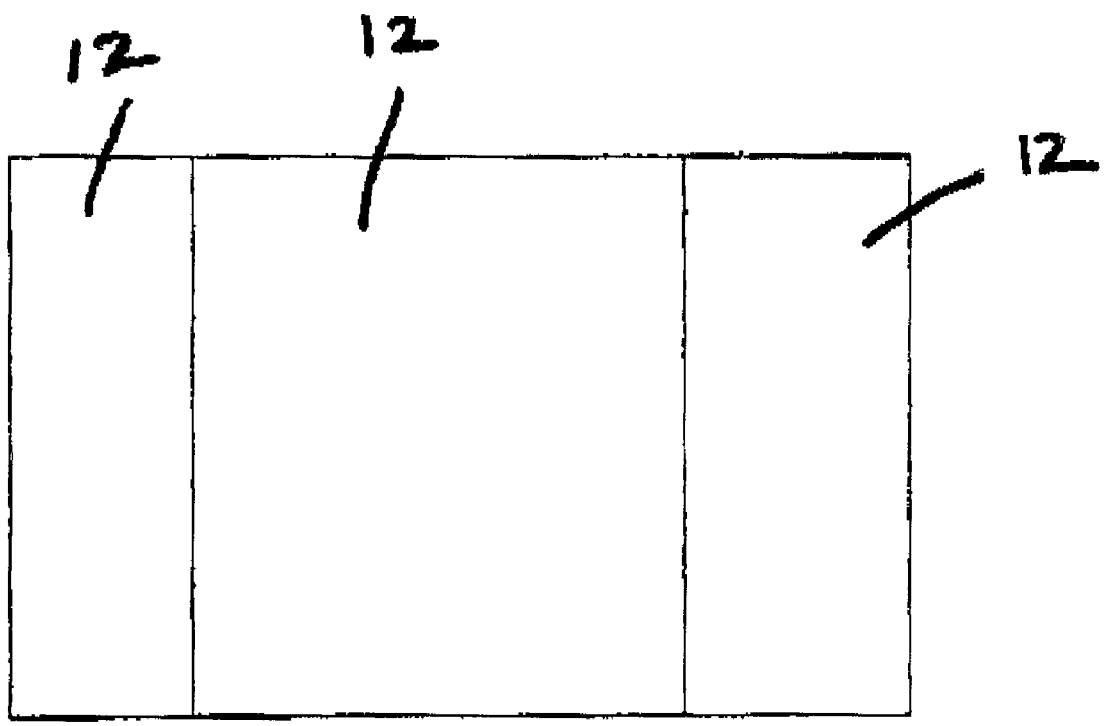
FIG. 12 is a building top-print of the building illustrated by FIG. 11.

For a building 5 with a sloped roof 14 as shown in FIG. 11, the building is approximated as having a number of horizontal roofs 12 with different elevations ranging from the minimum elevation of the sloping roof to the maximum elevation. The top-print of the building is approximated as a series of concentrated horizontal rooftop polygons 12 with different elevations associated with them, as shown in FIG. 12.

Figure 13:
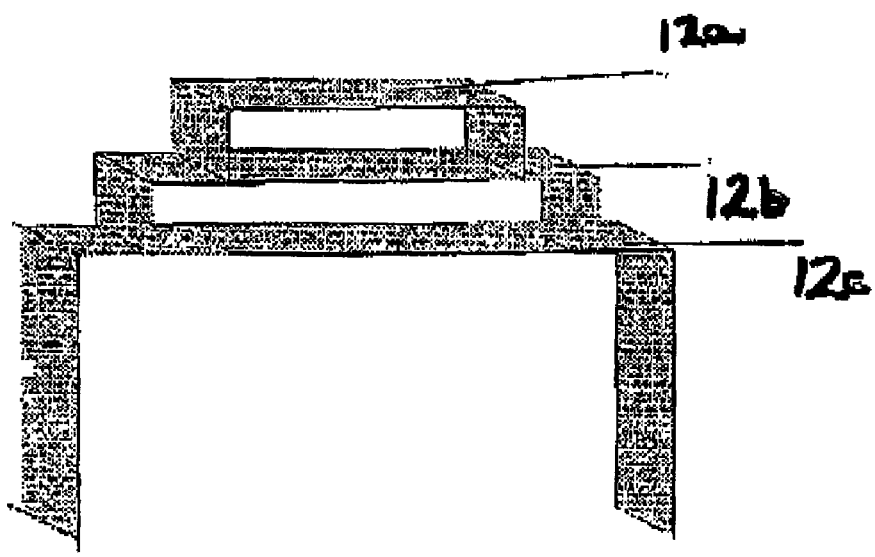
FIG. 13 is a three-dimensional representation of a building having an irregular rooftop.
Figure 14:
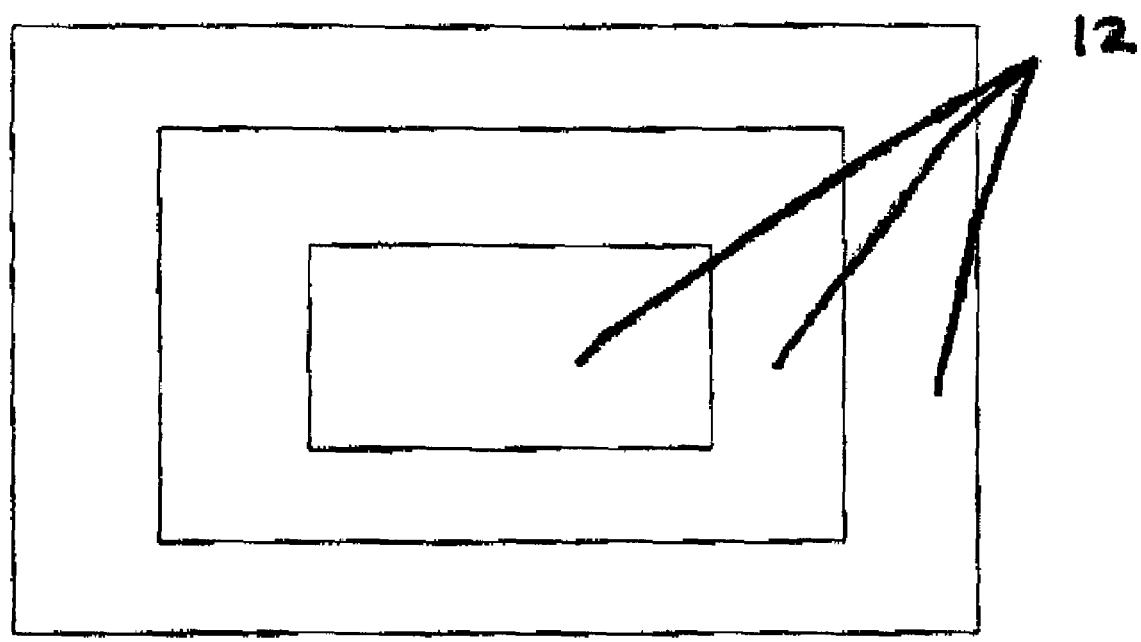
FIG. 14 is a building top-print of the building illustrated by FIG. 13.

In a case where the building has different elevations associated with its roof line (such as the Empire State Building, which has a telescoping vertical roof), the top-print model of the building consists of three concentric rooftop polygons 12 each with a different elevation associated with it. Consider a building that has three rooftop polygons 12 at elevations h1, h2, and h3 as shown in FIGS. 13 and 14. The top-print information would consist of three polygons 12, with and the elevations h1, h2 and h3 associated with each of these polygons.

The present invention uses building top-print information and building footprint information to construct a three-dimensional representation of the buildings. The building footprint models the footprints of the exterior walls of the buildings and also provides the elevation of the base of the building. Buildings are modeled as a set of horizontal and vertical flat polygon sources.

The top-print information of the building represents the building rooftop as a single or series of concentric horizontal polygonal surfaces with an arbitrary number of sides determined by the shape of the building. The rooftop is modeled as a horizontal polygonal surface with the X, Y and Z values of the vertices as obtained from the building top-print information. The vertical walls of the buildings are modeled as rectangular vertical polygonal surfaces. A rectangular vertical polygon is created for each edge of the rooftop polygon. A vertical rectangular polygon is constructed for each edge of the polygon. The X and the Y coordinates of all the four coordinates are obtained from the two vertices, which describe the edge of the roof polygon to which the vertical surface is associated with. The height of the vertical surface is the difference between the rooftop elevations and the base elevation as given by the building footprint.

Figure 15:
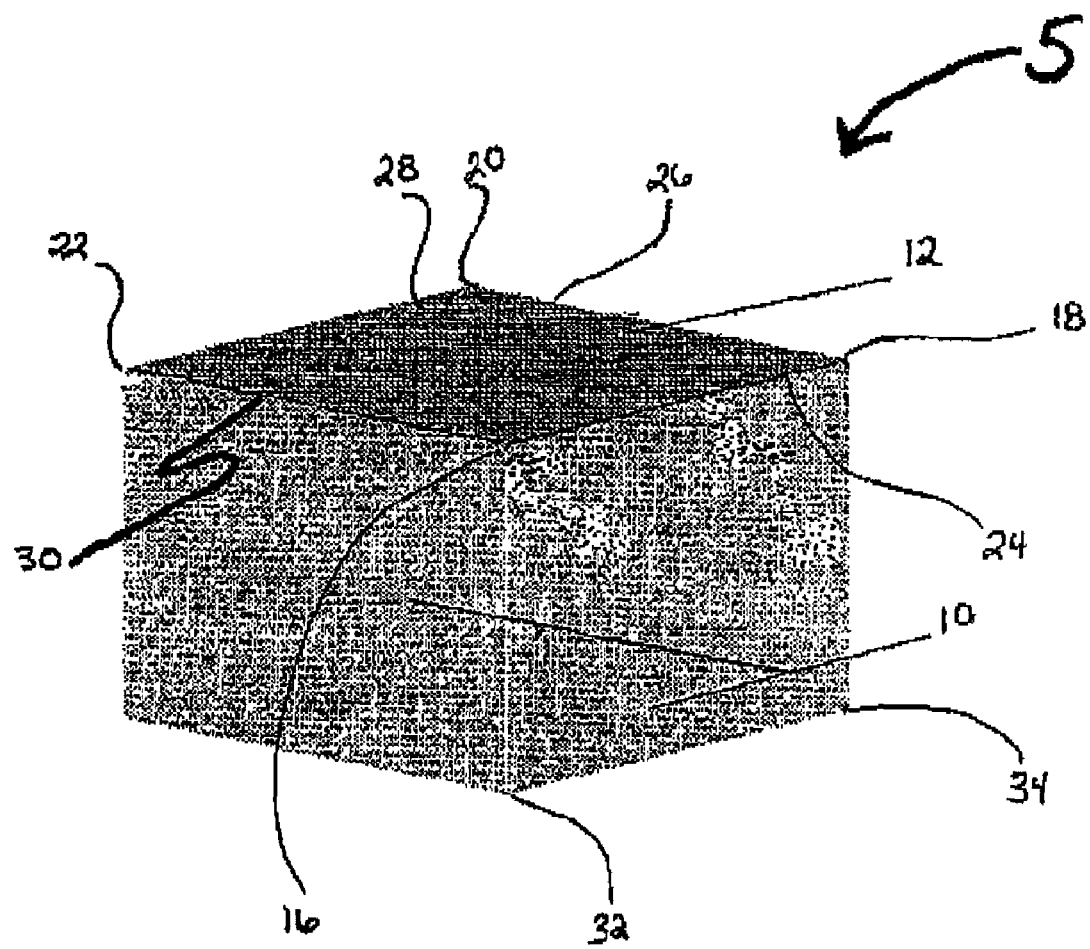
FIG. 15 is a three-dimensional representation of a building.

For example, consider a rooftop polygon with four vices 16, 18, 20, and 22 as shown in FIG. 15. The elevation of the rooftop is obtained along with the building top-print information. The elevation of the building base is obtained from the building footprint. The height of the rooftop above the ground can be calculated by subtracting the rooftop elevation from the base elevation. For each edge of the polygon 24, 26, 28, and 30, a rectangular vertical surface 10 is constructed. For example, for edge 24, a rectangular vertical surface 10 is constructed having vertices 16, 18, 32, and 34. In this fashion, a three-dimensional model of the cubic building 5 is generated.

Figure 16:
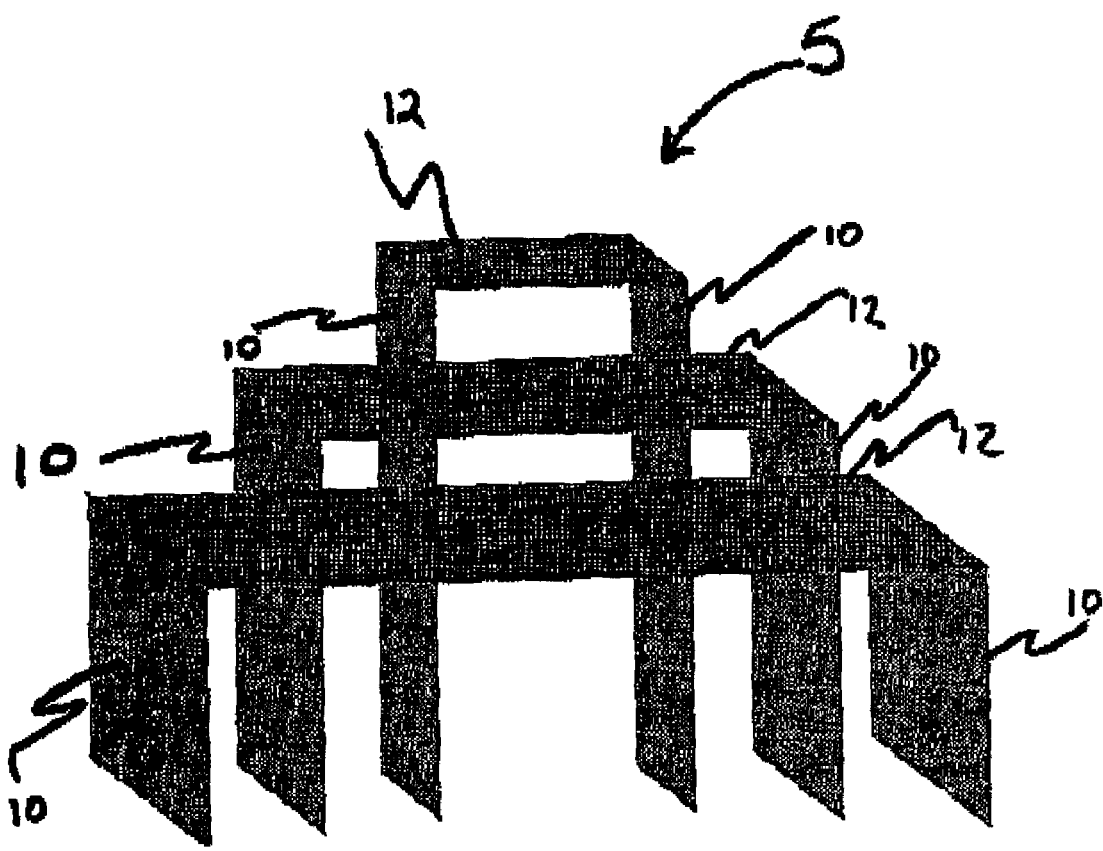
FIG. 16 is a cross-section of a three-dimensional building model of a building with an irregular rooftop.

A building 5 with a rooftop having different elevations, as in FIG. 16, would have vertical rectangular polygons 10 associated with each edge of all the roof top polygons 12. All the vertical polygons are considered to have the same elevation for their base. Thus, the building in FIG. 16 would be represented as a set of vertical and horizontal surfaces as shown in FIG. 13.

Using the techniques described above, the present invention is capable of converting from Building Footprint and Building Top-print information into a three-dimensional, polygonal surface representation of the buildings within any geographical area.

Using the techniques discussed in Ser. No. 09/318,841 now issued as U.S. Pat. No. 6,850,946, entitled "Method And System for a Building Database Manipulator," filed by T. S. Rappaport and R. R. Skidmore, the present invention enables the internal, three-dimensional physical structure of any building to be represented as a collection of polygonal surfaces.

In most cases, the data regarding for the terrain and the buildings are available from disparate sources. The terrain data is generally available as a DEM, which the present invention converts into a TIN format using one of the methods detailed above. The building data are generally available from independent vendors in the form of building top-prints and footprints. The present invention converts this information into the three-dimensional surface representation of building as detailed above. The internal representation of each building's physical structure may also be constructed as a three-dimensional digit model within the present invention. The present invention then merges the three-dimensional building exterior geometry information with the three-dimensional TIN surface representation of the terrain to form a single, composite representation of a given geographical areas. The composite three-dimensional terrain-building representation may then be combined with the three-dimensional representation of the internal structure of the buildings in order to form a seamless indoor-outdoor representation of any physical environment.

Figure 17:
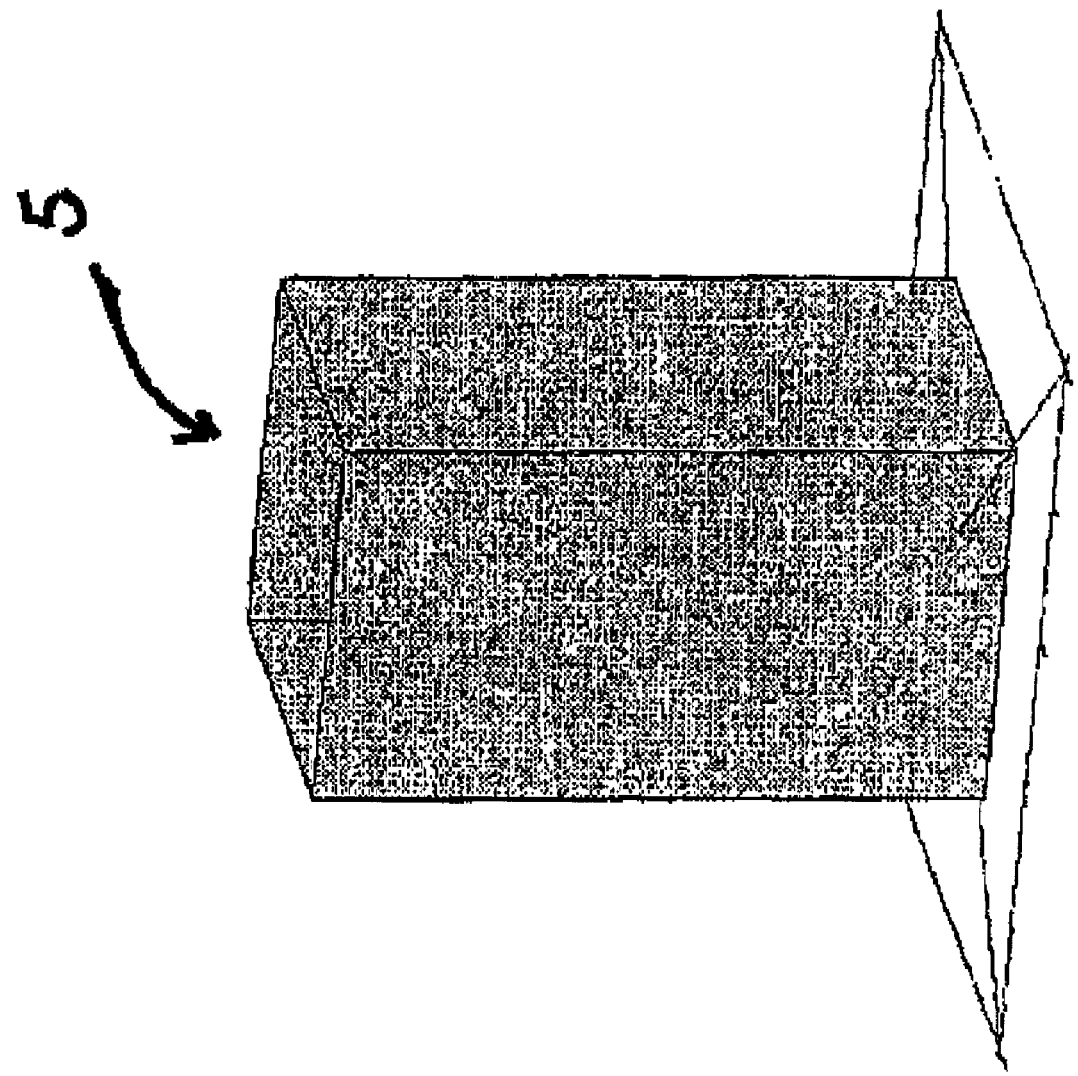
FIG. 17 is a representation of merged three-dimensional building and terrain Triangular Irregular Network information.

The present invention uses a novel approach to merge the terrain TIN information with the three-dimensional building information. In the present invention, the base of all of the vertical surfaces of each building is extended downwards until it is made equal to the lowest elevation of the terrain in the vicinity of the base of the building. When the three-dimensional representation of the buildings is then merged with the terrain TIN information, all vertical surfaces of the buildings are well entrenched into the terrain surface. FIG. 17 provides a graphical representation of a building 5 that has been merged into a simple TIN image. This eliminates any possibility of error due to a mismatch between the three-dimensional representation of the buildings and the terrain TIN information that may be caused due to resolution errors in the original terrain and/or building information in the vicinity of the base of the building. In the context of wireless communication system performance prediction, this eliminates potential problems with prediction methods based on ray tracing where only the first surface of intersection is considered, That is, just as in real life, the database model created by our invention provides that the terrain and building wall surface information are all represented as one surface without holes existing between them.

Once the three-dimensional building information has been merged with the terrain TIN information, the internal structure of any desired building can then be merged within the same database or referenced through a tagging process, such as by using a computer aided design software program like AutoCAD or SitePlanner, or any other representation of an in-building environment, in order to form a seamlessly integrated indoor-outdoor representation of the environment. This may be done by identifying the coordinates within the three-dimensional representation of the building and terrain model data, and then by using this coordinate to reference another database whereby the reference corresponds to the internal representation of each building. This reference may be done using a table look up procedure, whereby the building's internal model is referenced to a specific geographic. 2-D or 3-D coordinate representation, or this reference maybe done visually or interactively by the user, whereby the user visualizes a specific location of a building outline within the combined terrain and building environment, and then clicks a mouse or some type of selection device in order to link the reference of the desired in-building model. Alternatively, the user may type in a specific coordinate location or range of locations in order to view the corresponding in-building model. Alteratively, the in-building model may be represented in the same vector database produced by the combined terrain and building environmental model. The present invention then positions and merges the three-dimensional representation of the internal building structure with the combined building-terrain model through either automatic or manual means. The composite indoor-outdoor-terrain three-dimensional model may then be stored either as a single vector file format or as a series of database structures or associated files consisting of the coordinates and characteristics of the various three-dimensional planar surfaces comprising tho digital model. Note that tunnel environments or underground environments, such as found within basements of buildings or underneath city streets, and distributed networks of components installed therein, may also be modeled in the present invention using the described methods.

The present invention enables the user to interactively visualize and place models of telecommunication system components within the three-dimensional structure of any portion of the composite representation of the environment from any angle or orientation, such as in the embodiment described in application Ser. No. 90/318,842 now issued as U.S. Pat. No. 6,493,679, entitled "Method and System for Managing a Real Time Bill of Materials, filed by T. S. Rappaport and R. R. Skidmore, which is hereby incorporated by reference.

In addition, the invention allows the visualization and recording of simulated or predicted performance of telecommunication systems that would be designed, or which have already been designed for, operation within an actual physical 3-D environment that is modeled using the techniques taught herein, and furthermore supports the ability to compare predicted versus actual network or system performance, as well as the placement, display and storage of infrastructure equipment such as telecommunication system components and cables used to create a wireless or wired network. Embodiments of such prediction, visualization, and comparison capabilities that may be used in the invention, for example, are taught in applications Ser. No. 09/632,803, entitled "System and Method for Design, Measurement, Prediction and Optimization of Data Communication Networks," filed by T. S. Rappaport, R. R. Skidmore, and Ben Henty, Ser. No. 09/318,840 now issued as U.S. Pat. No.

6,317,599, entitled "Method and System for Automatic Optimization of Antenna Positioning in 3-D," filed by T. S. Rappaport and Roger R. Skidmore and Ser. No. 09/352,678 now issued as U.S. Pat. No. 6,499,006, entitled "System for the Three Dimensional Display of Wireless Communications System Performance," filed by T. S. Rappaport and Roger R. Skidmore, all of Wireless Valley Communications, Inc., wherein the above listed applications are hereby incorporated by reference.

The placement of infrastructure equipment may include cables, routers, antennas, switches, and the like, as contemplated by previous inventions by Wireless Valley Communications, Inc. or which would be required for a distributed network of components in a physical system. Important information associated with some or all pieces of infrastructure equipment that are modeled by and maintained within the invention using the described database format includes physical location (placement of the equipment within the database so as to site-specifically represent its actual physical placement) as well as data such as equipment vendors, part numbers, installation and maintenance information and history, system or equipment performance and alarm data and history, as well as cost and depreciation information of the specific components and subsystems.

This invention also enables a user to specify other physical, electrical, mechanical, and aesthetic characteristics of any surface or object within the three-dimensional model. These characteristics include but are not limited to: attenuation, surface roughness, width, material, reflection coefficient, absorption, color, motion, scattering coefficients, weight, amortization data, thickness, partition type, owner and cost. In addition, information that is readily readable or writeable in many widely accepted formats, can also be stored within the database structure, such as general location data, street address, suite or apartment number, owner, lessee or lessor, tenant or ownership information, model numbers, service records, maintenance records, cost or depreciation records, accounting records such as purchasing, maintenance, or life cycle maintenance costs, as well as general comments or notes which may also be associated with any individual surface or building or object or piece of infrastructure equipment within the resulting three-dimensional model of the actual physical environment.

Figure 18:
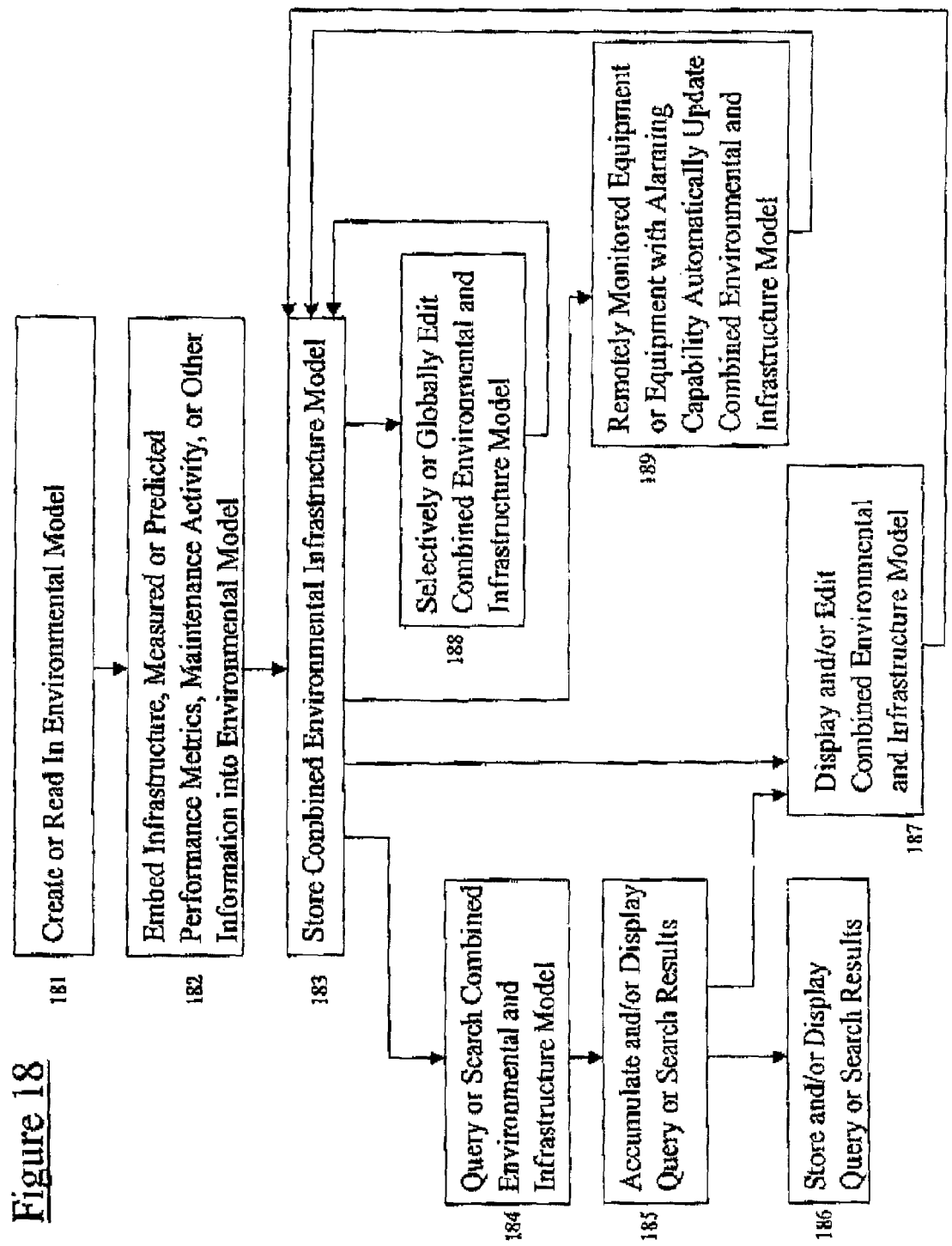
FIG. 18 is a flow diagram showing the general process for querying and extracting information from the three-dimensional model.

Referring next to FIG. 18, there is shown the general process for providing, querying and extracting information from the combined environmental and infrastructure models. Note that a three-dimensional or series of two-dimensional slices of a site-specific environmental model is created 181 using processes defined previously, or using techniques described in applications Ser. No. 09/318,841 now issued as U.S. Pat. No. 6,850,946 entitled "Method And System For a Building Database Manipulator," filed by T. S. Rappaport and R. R. Skidmore, and Ser. No. 09/633,120 now issued as U.S. Pat. No. 6,721,769 entitled "Improved Method and System for a Building Database Manipulator," filed by T. S. Rappaport and R. R. Skidmore, hereby incorporated by reference. Then, the communications network is site-specifically modeled within the invention by manual or automatic means, whereby the actual physical components used to create actual physical network are modeled, placed and interconnected graphically, visually, and spatially within the site-specific database model in order to represent their actual true physical placements within the actual physical environment. This provides a site-specific model of a network of interconnected components with the database model.

Associated with at least some of the network components (infrastructure equipment) within database model are infrastructure information, which may be in the form of data records, or files, or text entries which contain infrastructure information that is uniquely associated in space with every individual component within the modeled environment. That is, three different pieces of the same type of equipment within a network that is modeled within a city using this invention would have three distinct sets of infrastructure information records. The infrastructure information records are stored as either a linked list of textual or numeric information to the graphically represented components, or as data structures that are in some manner tagged or linked to the specific components within the database format.

Alternatively, the infrastructure information records may be stored outside of the presently described database format, although this is more cumbersome and requires additional overhead to provide the desired linkage to the actual, unique, site-specific component within the database model. As discussed below, these infrastructure information records provide key interaction between the modeled components that are site-specifically modeled in the asset management system and the actual physical infrastructure equipment that is installed or predicated for use in the actual physical environment. The infrastructure information is shared between the site-specific model of the network (that is capable of running predictions and tracking cost and maintenance records), the actual network (which is working and may provide measured performance over time), and the managers of the network (users who need to be able to manage and compare on-going performance and quality of the actual network using the site-specific asset management system described here). The infrastructure information contained within the records may be modified, edited, altered, and analyzed by a wide variety of methods over time, as described below.

A computer program permits connection and interaction between the modeled components within the modeled network and the actual components that make up the actual physical network, so that ongoing, periodic, or sporadic communication may occur and so that on-going measured data may be retained and processed by the invention. Additionally, the computer program will allow the components comprising the physical network to be remotely controlled. For example, an engineer can remotely adjust the power supplied to a base station antenna in the network in response to an alarm sent by the base station or a remote receiver. Alternatively, the program, itself, may automatically cause such changes based on preprogrammed responses.

The infrastructure information for each actual physical component may be represented in a site-specific manner within the environmental model of the physical environment, and such infrastructure information is preferably embedded within the environmental model 182 as described above. The embedding of infrastructure information for actual components may be done either prior to, during, or after the site-specific placement of the modeled components within the database model.

The infrastructure information includes but is not limited to graphical objects representing the actual physical locations of infrastructure equipment used in the actual communication system, as well as data describing the physical equipment brand or type, a description of physical equipment location (such as street address, suite or apartment number, owner or tenant, latitude-longitude-elevation information, floor number, basement or subterranean designation, GPS reading, etc.), equipment settings or configurations, desired or specified performance metrics or performance targets for the equipment whereby such desired or specified data are provided by the use or the prediction system, desired or specified performance metrics or performance targets for the network which the equipment is a part of, whereby such desired or specified data are provided by the user or the prediction system, measured performance metrics or network metrics as reported by the equipment, predicted alarm event statistics or outage rates, actual measured alarm event statistics or outage rates, alarm threshold settings or alarm metrics as reported by the equipment or the user or the prediction system, equipment orientation, equipment specifications and parameters, equipment manufacturer, equipment serial number, equipment cost, equipment installation cost, ongoing actual equipment upkeep costs and records, predicted ongoing equipment upkeep costs, equipment use logs, equipment maintenance history, equipment depreciation and tax records, predicted or measured performance metrics, equipment warranty or licensing information, equipment bar codes and associated data, information regarding methods for communicating with the physical equipment for the purposes of remote monitoring and/or alarming, alarm records, malfunction records, periodic or continuous performance or equipment status data, previous or current physical equipment users or owners, contact information for questions or problems with the equipment, information about the vendors, installers, owners, users, lessors, lessees, and maintainers of the equipment, and electronic equipment identifiers such as radio frequency identifiers ("RF Ids" or "RF Tags"), internet protocol ("IP") addresses, bar codes, or other graphical, wired, or wireless address or digital signature.

Said "equipment" or "component" above refers to any actual physical object or device, which may be mechanical or electrical or arterial in nature, or any architectural or structural element of a distributed network, including but not limited to wiring, piping, ducting, arteries, or other distributed components or infrastructure.

While the present invention considers the site-specific database model and asset management of a wired or wireless communication network as a preferred embodiment, it should be clear to one of ordinary skill in the art that any infrastructure equipment of a distributed nature, such as structured cabling, piping, or air conditioning is taught herein. Some preferred methods for embedding the infrastructure information within a site-specific environmental model is detailed in applications Ser. No. 09/318,842 now issued as U.S. Pat. No. 6,493,679, entitled "Method and System for Managing a Real Time Bill of Materials," filed by T. S. Rappaport and R. R. Skidmore, Ser. No. 09/221,985 now issued as U.S. Pat. No. 6,442,507, entitled "System for Creating a Computer Model ad Measurement Database of a Wireless Communication Network," filed by T. S. Rappaport and R. R. Skidmore, Ser. No. 09/318,840 now issued as U.S. Pat. No. 6,317,599, entitled "Method and System for Automated Optimization of Antenna Position in 3-D," filed by T. S. Rappaport and R. R. Skidmore, Ser. No. 09/628,506 now issued as U.S. Pat. No. 6,971,063, entitled "System, Method and Apparatus for Portable Design, Deployment, Test, and Optimization of a Communication Network," filed by T. S. Rappaport, R. R. Skidmore, and B. T. Gold, Ser. No. 09/633,121 now issued as U.S. Pat. No. 6,625,454, entitled "Method and System for Designing and Deploying a Communications Network which Considers Frequency Dependent Effects," filed by T. S. Rappaport, R. R Skidmore, and E. Reifsnider, and Ser. No. 09/632,853 now issued as U.S. Pat. No. 7,085,697, entitled "Method and System for Designing or Deploying a Communications Network which Considers Component Attributes," filed by T. S. Rappaport, R. R. Skidmore, and E. Reifsnider, all of which are hereby incorporated by reference.

The resulting combined environmental and infrastructure model, wherein the modeled infrastructure and the associated infrastructure information for each component having been embedded in the environmental model in a site-specific manner, may then be stored onto any variety of computer media 183. At any point in time, the combined environmental and infrastructure model may be retrieved from the computer media, displayed or processed in a site-specific manner with actual locations of components and component interconnections shown within the environment on a computer monitor, printer, or other computer output device, and/or edited using a computer mouse, keyboard or other computer input device known now or in the future 187. Said editing may involve changing any of the infrastructure or environmental information contained in the model.

In addition, the combined environmental and infrastructure models stored on computer media may be queried and searched for specific information 184 through manual interaction by a user or by one or more computer programs that systematically search through the environmental models for specific data (data mining). This provides a new asset management system that allows one to aggregate, retrieve, analyze, compare, or measure extensive amounts of site-specific information for a large number of distinct networks that are operating throughout the world, whereby each network is modeled using the described site-specific environmental and infrastructure information.

For example, a large wireless carrier or large real estate firm may own many hundreds of buildings or campuses. The corporation may design and then manage all aspects of all of its installed wireless networks at each of its campuses using the disclosed database model and asset management system. Specifically, the corporation would model each campus network as an individual file, record, or directory, where each file would contain the described database model and the described site-specific modeling approach that combines the environmental and infrastructure information. Preferably, each campus network would be represented using SitePlanner, a product by the applicant, as a single SitePlanner file. By standardizing on the disclosed approach, each of the actual networks would be modeled using the same, unified standard database. As described here, the modeled network on a computer using this invention could communicate with the actual physical network equipment, thereby allowing the corporation to rapidly monitor all of its networks for performance or alarms, and would allow the corporation to store and analyze or aggregate all of the network information for all of its campuses at a single computer or location. Furthermore, by storing the predicted and actual cost data associated with each component in the network, and storing the predicted and actual on-going failure rates or costs associated with maintenance of each component in the network, the present invention offers powerful cost-analyses that can aid in on-going network management decisions.

In the preferred embodiment of the invention, information may be analyzed by identifying specific criteria to search for across one or more environmental and infrastructure files. For example, a user of the invention may input search criteria to find all locations where a particular model number designating a piece of equipment is used, or may wish to search all locations where particular pieces of equipment are installed. All of the combined environmental and infrastructure models stored on computer media may be searched using the supplied criteria, or the user may decide to restrict the search to a selected subset of the environmental and infrastructure models. For example, the user may decide to search all files across several computers, all files on a particular computer, or selected individual files on one or more computers.

To perform the search, the set of combined environmental and infrastructure models (files) selected by the user are searched and the environmental models containing the requested pieces of equipment will be displayed to the user on the computer monitor with the requested pieces of equipment highlighted or identified in some fashion. Alternately, search criteria may take the form of identifying the total quantity of certain types of communications infrastructure equipment, as well as equipment's cost, actual or predicted maintenance history, supplier, actual or predicted alarm history, actual or predicted performance history, etc. Alternatively, a breakdown of all infrastructure installed within a certain geographical area, along with the per unit and total equipment, installation, and maintenance cost, could be rapidly determined. The determination of warranty expiration timelines for communications equipment, or many other such data such as outage and average and worst-case performance metrics, are readily aggregated and retrieved. The results of the query may lead to the display and/or editing of the combined environmental and infrastructure models 187 as discussed above, or the query results themselves may be stored as, for example, a spreadsheet or text computer file onto a variety of computer media 186. Furthermore, results pertaining to specific components are displayed directly on the site-specific representation of the components in the 3-D database. One skilled in the art could see how the form of the search criteria may take vary different forms within the scope of the present invention.

In addition, the combined environmental and infrastructure models stored on computer media may be automatically searched and edited or updated 188. In the preferred embodiment of the invention, this takes the form of identifying specific criteria to search for, and then a replacement set of criteria to apply in its place. For example, a user of the invention may input search criteria to find a particular piece of equipment and replace it with an alternate piece of equipment, along with the replacement of any or all infrastructure information data that relates to the equipment. In this case, any instances of the specified piece of equipment found in the searched environmental models are replaced with the alternate equipment. This enables users of the invention to carry out a limited or global search and replace of infrastructure across all or selected environmental and infrastructure models, which is required when a contemplated or actual change-out of infrastructure is enacted by a wireless carrier. When the search and edit operation is complete, the environmental and infrastructure models that were edited as a result of the operation may be stored to computer media 183.

Furthermore, the combined environmental and infrastructure models stored on computer media may contain models of infrastructure equipment that can communicate and exchange data with a computing platform in real-time. This enables the invention to measure, predict, display, aggregate, and store equipment performance, where performance data includes but is not limited to sensible performance metrics such as frequency utilization (such as a spatial-temporal record of occupied channels, unused channels, and lists of channels associated with different transmitters, where channel lists and channelization methods or strategies may be monitored, established, or adjusted remotely by the present invention), capacity utilization (such as data throughput performance, amount of blocked or delayed calls or packets, holding times or dropped traffic data, instantaneous or time averaged data transport, and other metrics that denote the amount of capacity provided over a specific spatial environment, some of which may be adjusted, monitored or established by the present invention) received signal strength (RSSI), signal-to-interference ratio (SIR), signal-to-noise ratio (SNR), bit error rate (BER), loading, capacity, frame error rate (FER), frame resolution per second, traffic, packet error rate, packet latency, packet jitter, interference levels, power levels, quality of service (QoS), data throughput, outage statistics, failure rates, temperature, pressure, flow rate, environmental conditions, power consumption and fluctuation, production levels, storage levels, cycle time, or other performance metrics or statistics known now or in the future. Further, using the infrastructure information records, this enables the invention to remotely access equipment for the purposes of remote monitoring, malfunction detection and/or alarm generation, or other forms of messaging known now or in the future. For example, the invention may store desired network operating performance parameters that are communicated to certain pieces of actual equipment, and if the equipment ever measures the network performance and finds the performance parameters out of range, an alarm is triggered and reported to the invention for display, storage, processing and possible remote returning of pieces of equipment by the invention to readjust the network to move performance back into the desired range.

Communication between die physical equipment and the combined environmental and infrastructure model running on a computer may occur via the Internet, via standard communication protocols such as SNMP and TCP/IP, wireless or wired telephone networks, passive or active wireless RF tags, bar code scanning, or any other wired or wireless communication system known now or in the future. This communication could be unidirectional, where information is only being sent from the environmental model to the physical equipment or vice versa, or the communication could be bidirectional, where information is being set back and forth between the environmental model and the physical equipment. A communication link between the site-specific environmental and infrastructure model and the physical equipment represented in the environmental and infrastructure model could be established or initiated by either side of the link, and may be established on a continuous, periodic, or intermittent basis, so that information may be exchanged 189. This information may take the form of commands or instructions for the equipment to perform certain actions or for the database to receive or request certain results. For example, as described above, an engineer can remotely control the physical equipment making up the network by interacting with the site-specific environmental model. This information may also include the results of those actions, as well as previously described measured equipment performance such as the metrics listed above, updated maintenance or equipment use information, inspection logs, cost or price information, physical positioning information, time, malfunction or hazard alerts, emergency information, new or updated instruction sets, updated or new equipment information, or any other form of communication that may be supported by, generated by, recorded by, or reported by the equipment. Information received from physical equipment via the communication link is then automatically embedded within the site-specific environmental and infrastructure model 189, and maybe be displayed, aggregated, processed, analyzed, and/or stored. The communication between the site-specific environmental and infrastructure model and the physical equipment may be manually initiated by a user of the invention or automatically and periodically initiated by either the invention or the physical equipment, or automatically initiated by the physical equipment in response to some pre-determined or experienced or measured event.

For example, a particular piece of equipment may have the ability to automatically and periodically perform a diagnostic routine on itself and report the results. In the present invention, if that piece of equipment has been site-specifically modeled and embedded within an environmental model as described above, the results of the diagnostic routine for the equipment can be automatically received from the equipment and embedded into the environmental model for that piece of equipment. The updated environmental and infrastructure models may then be stored 183 with the new information embedded in the model. Similarly the physical equipment may be capable of monitoring performance metrics such as quality of service (QoS), throughput, or other important performance metrics of the network it is a part of, and such data may be communicated to, received by, stored, displayed, and processed by the invention.

Figure 19:
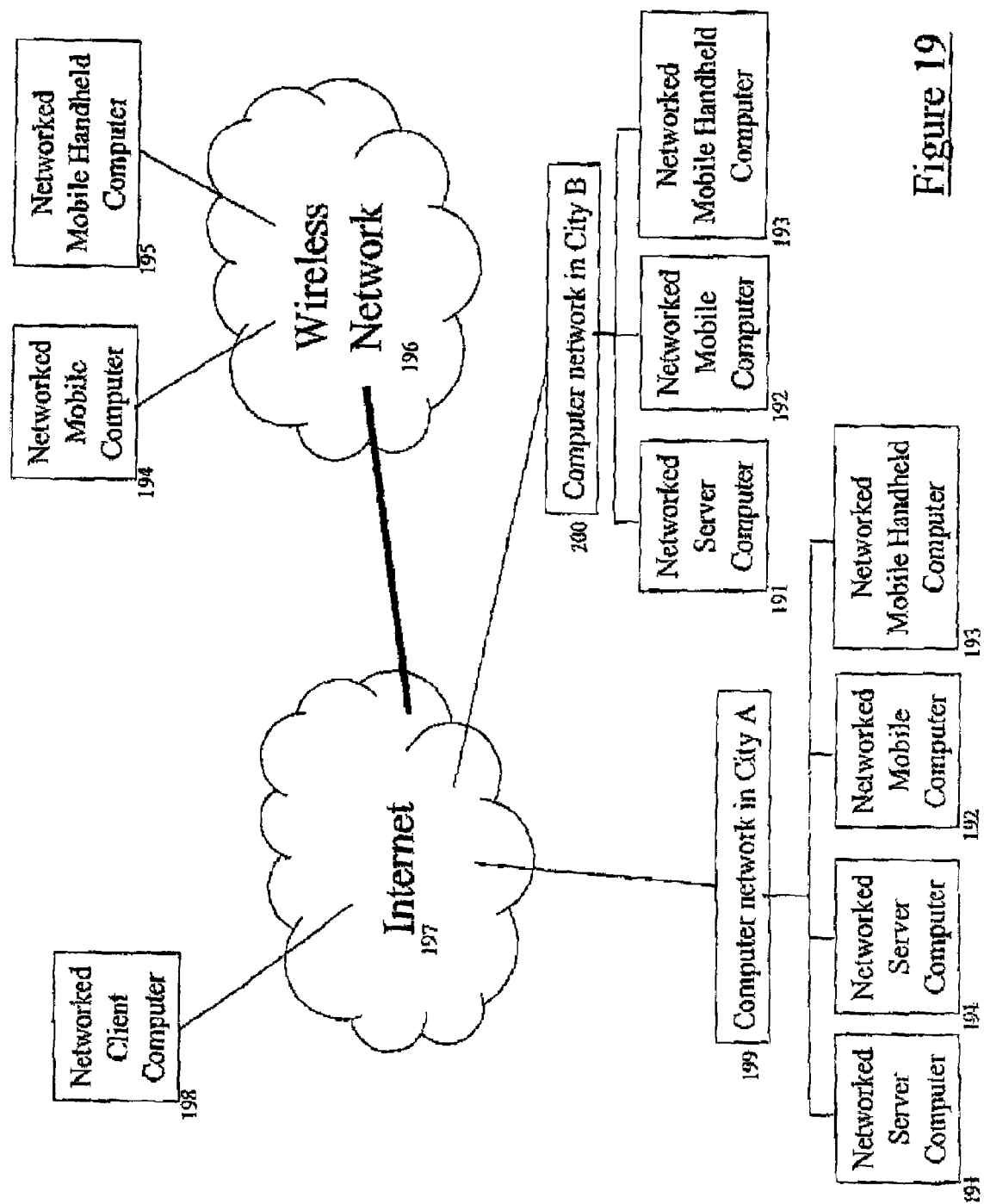
FIG. 19 is a block diagram of a typical configuration of computing platforms

Referring now to FIG. 19, there is shown a typical configuration of computing platforms. Computing platforms connected to a computer network 191, mobile computers ("laptops") connected to a computer network 192, and/or handheld computers 193 (e.g., Palm Pilots, PocketPCs, etc.) may be used to create, display, edit, search, and store the combined environmental and infrastructure models discussed previously. Through the Internet (or other networked means such as leased lines or satellite link) 197, computing platforms 191, 192, 193 way share environmental and infrastructure models with one another. This enables computing platforms in geographically diverse locations, such as different regions or cities 199, 200, to have shared access to environmental and infrastructure models. For example, a computer attached to the computer network 198 may create, display, edit, search, and store combined environmental and infrastructure models on any other computer 191, 192, 193 on the computer network. In a similar fashion, mobile computing platforms 194, 195 that are connected to some form of wireless network 196, such as a wireless local area network, cellular or personal communication system network, or other wireless communication network now known or in the future, which has access to the Internet 197, may also access and share environmental and infrastructure models. In these situations, a user of the invention using a client computer 193 attached to the Internet 197 in some manner could access the available combined environmental and infrastructure models stored on other computer platforms 191, 192, 193, 194, 195. Thus, environmental and infrastructure models located on computing platforms accessible via the Internet, even in geographically remote locations, can be included in the querying, search and replace, and remote, monitoring activities described previously.

Thus, a powerful and now capability offered by the present invention is the ability to create an asset management system that can mine the information stored in files that each use a unified database such that a user can quantify specific information about the placements, predicted performance measured performance, maintenance history, cost history, and troubleshooting data for particular components or for several different distributed networks. A single database format may be used in order to create knowledge in the aggregate of many different telecommunication systems or networks that may each be designed in different physical locations throughout the world, each using the same database standard as disclosed in this patent. For example, a user of the current invention would be able to instantly query the files of wireless telecommunication networks designed in different cities, whereby each city would have the terrain, outdoor and indoor environments represented in the disclosed database format. Within the same format would be models of the physical locations of the installed cables, antennas, base stations, switches, routers, leaky feeders, and all other infrastructure needed to build out the functioning telecommunication network, and each infrastructure component placed within the 3-D environmental model in approximately the exact location as where the actual asset is physically located. In addition, the actual measured performance of the network (as measured by well known commercial products for wireless and wired networks and as contemplated by patent applications by Wireless Valley Communications, Inc.) as well as the predicted performance of the network, as contemplated by current products and through previous patent disclosures by Wireless Valley Communications, Inc., would also be stored in this 3-D environmental model. Then, by accessing the many different files created to different cities or portions of a city, a computer program or base system would generate a series of reports, such as a computer file, a printed table, a printed list or a visual slideshow or graphical outputs of where a particular type of cable is located throughout a world-wide telecommunication network, or what type of frequency planning is employed both within buildings and outside of buildings, for example. Similarly, it would be possible to rapidly determine, using the contemplated inventions, the entire cost of installed network infrastructure, or to determine the age or depreciation or total length of a particular type of cable used throughout the construction of the global network. In addition, the ability to keep track of the physical location of infrastructure assets, and their on-going cost, performance, depreciation, and maintenance data, within a single modeling and data mining environment is offered by our invention.

The present invention represents a significant improvement over the prior art in that it automates the creation of a seamless three-dimensional computer representation of an indoor-outdoor environment with terrain and man-made as well as natural features modeled, and also supports the ability to store measured or predicted data, and comparisons thereof, as well as cost and maintenance data and other spatially accurate and important aspects of a telecommunication infrastructure. The invention stores the representation of the infrastructure in a vector data format with a myriad of important performance, cost, depreciation, maintenance, and operational data, and provides the means to interact with, read from, write to, store, collect information about, and visualize the specific infrastructure and the network it supports, within a three-dimensional environment.

While the intention has been described in terms of its preferred embodiments, those skilled in the art will recognize that the invention can be practiced with modifications within the spirit and scope of the appended claims. For example, while a telecommunications network is contemplated, it is clear that other types of infrastructure, such as plumbing or electrical facilities or structured cable could also be represented using similar concepts and principles as described here.

Having thus described my invention, what I claim as new and desire to secure by Letters Patent is as follows:

1. A network management system for a wireless communications network, comprising:
a plurality of components distributed within a physical environment, at least one of said plurality of components being used to provide infrastructure necessary for wireless communications;
at least one measurement device for measuring at least one wireless communication performance data pertaining to the wireless communications network;
one or more computer platforms, that communicate with at least one or more of said plurality of components, on which a computerized site specific model of said physical environment is displayed, said computerized site specific model presenting on a display a representation of said physical environment with computer representations of said plurality of components distributed in said representation of said physical environment, and information pertaining to said at least one wireless communication performance data in said physical environment, wherein at least one of said computer representations of said plurality of components is associated with at least one of cost data, infrastructure data, maintenance data, ownership data, performance data, installation data, depreciation data, and equipment settings, said one or more computer platforms providing at least one of:
(I) an indication that said at least one wireless communications performance data measured by said at least one measurement device is or is not satisfactory in the wireless communications network; or
(II) control signals or instructions for adjusting one or more parameters of one or more of said plurality of components distributed within said physical environment.

2. The network management system of claim 1 wherein said at least one measurement device is positioned within said physical environment.

3. The network management system of claim 1 wherein said at least one measurement device is the same as said at least one of said plurality of components to provide infrastructure for wireless communications.

4. The network management system of claim 1 wherein said at least one measurement device is contained as part of said at least one of said plurality of components to provide infrastructure for wireless communications.

5. The network management system of claim 1 wherein said parameter to be adjusted is antenna orientation.

6. The network management system of claim 1 wherein said parameter to be adjusted is transmitted power.

7. The network management system of claim 1 wherein said parameter to be adjusted is data rate.

8. The network management system of claim 1 wherein said parameter to be adjusted is modulation method.

9. The network management system of claim 1 wherein said parameter to be adjusted is bandwidth.

10. The network management system of claim 1 wherein said parameter to be adjusted is transmitting frequency.

11. The network management system of claim 1 wherein said parameter to be adjusted is receiving frequency.

12. The network management system of claim 1 wherein said performance data is signal strength.

13. The network management system of claim 1 wherein said performance data is interference or noise.

14. The network management system of claim 1 wherein said performance data is signal to interference ratio.

15. The network management system of claim 1 wherein said performance data is data throughput.

16. The network management system of claim 1 wherein said performance data is power levels or status.

17. The network management system of claim 1 wherein said performance data is quality of service.

18. The network management system of claim 1 wherein said performance data is data latency.

19. The network management system of claim 1 wherein said performance data is traffic or capacity utilization.

20. The network management system of claim 1 wherein said one or more computer platforms provides (I) an indication that said at least one performance data measured by said at least one measurement device is or is not satisfactory for a particular user in the wireless communications network, and provides an indication of the value of said at least one performance data.

21. The network management system of claim 1 wherein said one or more computer platforms provides (I) an indication that said at least one performance data measured by said at least one measurement device is or is not satisfactory for some or all of the users in the wireless communications network, and provides an indication of the value of said at least one performance data.

22. The network management system of claim 1 further comprising a means for selecting a level of satisfactory or unsatisfactory performance for a performance data for one or more users in the wireless communication network.

23. The network management system of claim 1 wherein said one or more computer platforms provides (II) control signals or instructions for adjusting one or more parameters of one or more of said plurality of components distributed within said physical environment.

24. The network management system of claim 1 wherein said display presents at least a portion of one or more floor plans of one or more buildings in combination with one or more of
a representation of locations of said plurality of components together with said at least a portion of said one or more floor plans or said one or more buildings, and
a representation of said at least one or more wireless communication performance data together with said at least a portion of said one or more floor plans or said one or more buildings.

25. The network management system of claim 1 further comprising an indicator for providing an indication of the value or acceptability of said at least one wireless communication performance data.

26. The network management system of claim 1 wherein said at least one wireless communication performance data is for one or more users of the wireless communication network.

27. The network management system of claim 1 wherein said site specific model of said physical environment can have infrastructure information added or subtracted prior to, during or after placement of computer representations of said plurality of components in the computerized site specific model.

28. The network management system of claim 1 further comprising means, associated with one or more of said computer platforms, for storing, sending, aggregating, analyzing, displaying or retrieving predicted or measured information pertaining to the wireless communication network wherein said predicted or measured information is selected from the group consisting of maintenance data, performance data, cost data, installation data, infrastructure data, depreciation data, and ownership data.

29. The network management system of claim 1 further comprising means, associated with one or more of said computer platforms for generating one or more reports on predicted or measured information pertaining to the wireless communication network wherein said reports are selected from the group consisting of computer files, tables, lists, slideshows, and graphical outputs.

30. A network design and management system for a wireless communications network, comprising:
one or more computer platforms on which a computerized site specific model of a physical environment is displayed, said computerized site specific model has a representation of said physical environment with computer representations of a plurality of components distributed in said physical environment, wherein at least one of said computer representations of said plurality of components is associated with at least one of cost data, infrastructure data, maintenance data, ownership data, performance data, installation data, depreciation data, and equipment settings, at least one of said one or more computer platforms can provide a prediction of one or more wireless communications performance data based on said computerized site specific model;
a plurality of physical components distributed or distributable within said physical environment represented by said computerized site specific model, at least some of said plurality of physical components corresponding to at least some of said plurality of components represented in said computerized site specific model of said wireless communications network, at least one of said plurality of physical components being used to provide infrastructure for wireless communications; and
at least one measurement device for measuring at least one wireless communication performance data pertaining to the wireless communications network,
wherein at least one of said one or more computer platforms communicates with at least one of said plurality of physical components, and provides at least one of:
(I) an indication that said at least one wireless communication performance data measured by said at least one measurement device is or is not satisfactory for one or more users of the wireless communications network; or
(II) control signals or instructions for adjusting one or more parameters of one or more of said plurality of physical components distributed within said physical environment.

31. The network design and management system of claim 30 wherein said computerized site specific model is modifiable with said one or more computer platforms.

32. The network design and management system of claim 30 wherein said display presents at least a portion of one or more floor plans of one or more buildings in combination with one or more of
a representation of locations of said plurality of components together with said at least a portion of said one or more floor plans or said one or more buildings, and
a representation of said at least one or more wireless communication performance data together with said at least a portion of said one or more floor plans or said one or more buildings.

33. The network design and management system of claim 30 wherein one or more of said plurality of components represented in said computerized representation of said wireless communication network have at least one of cost data, maintenance data, ownership data, performance data, installation data, infrastructure data, depreciation data, and equipment settings associated therewith.

34. The network design and management system of claim 30 wherein one or more features of said computerized site specific model have values or attributes assigned thereto which impact one or more wireless communication performance data.

35. The network design and management system of claim 30 wherein said at least one measurement device is positioned within said physical environment.

36. The network design and management system of claim 30 wherein said at least one measurement device is the same as said at least one of said plurality of physical components used to provide infrastructure for wireless communications.

37. The network design and management system of claim 30 wherein said at least one measurement device is contained as part of said at least one of said plurality of physical components used to provide infrastructure for wireless communications.

38. The network design and management system of claim 30 wherein said parameter to be adjusted is antenna orientation.

39. The network design and management system of claim 30 wherein said parameter to be adjusted is transmitted power.

40. The network design and management system of claim 30 wherein said parameter to be adjusted is data rate.

41. The network design and management system of claim 30 wherein said parameter to be adjusted is modulation method.

42. The network design and management system of claim 30 wherein said parameter to be adjusted is bandwidth.

43. The network design and management system of claim 30 wherein said parameter to be adjusted is transmitting frequency.

44. The network design and management system of claim 30 wherein said parameter to be adjusted is receiving frequency.

45. The network design and management system of claim 30 wherein said performance data is signal strength.

46. The network design and management system of claim 30 wherein said performance data is interference or noise.

47. The network design and management system of claim 30 wherein said performance data is signal to interference ratio.

48. The network design and management system of claim 30 wherein said performance data is data throughput.

49. The network design and management system of claim 30 wherein said performance data is power levels or status.

50. The network design and management system of claim 30 wherein said performance data is quality of service.

51. The network design and management system of claim 30 wherein said performance data is data latency.

52. The network design and management system of claim 30 wherein said performance data is traffic or capacity utilization.

53. The network design and management system of claim 30 wherein said one or more computer platforms provides (I) an indication that said at least one performance data measured by said at least one measurement device is or is not satisfactory for one or more particular users in the wireless communications network and provides an indication of the value of said at least one performance data.

54. The network design and management system of claim 30 further comprising a means for selecting a level of satisfactory or unsatisfactory performance for said wireless communication performance data for one or more users in the wireless communication network.

55. The network design and management system of claim 30 wherein said one or more computer platforms provides (II) control signals or instructions for adjusting one or more parameters of one or more of said plurality of physical components distributed within said physical environment.

56. The network design and management system of claim 30 further comprising an indicator for providing an indication of the value of said at least one performance data.

57. The network design and management system of claim 2 wherein at least one of said one or more computer platforms manually or automatically corrects or issues one or more (II) control signals or instructions for adjusting one or more parameters of one or more of said plurality of physical components distributed within said physical environment.

58. The network design and management system of claim 4 wherein said at least one of said one or more computer platforms is remote from said plurality of physical components.

59. The network design and management system of claim 1 wherein said one or more computer platforms which provides (II) control signals or instructions for adjusting one or more parameters of one or more of said plurality of physical components distributed within said physical environment is remote from said plurality of physical components.

60. The network design and management system of claim 30 wherein said at least one wireless communication performance data is for one or more users of the wireless communication network.

61. The network design and management system of claim 30 wherein said site specific model of said physical environment can have infrastructure information added or subtracted prior to, during or after placement of computer representations of said plurality of components in the computerized site specific model.

62. The network design and management system of claim 30 further comprising means, associated with one or more of said computer platforms, for storing, sending, aggregating, analyzing, displaying or retrieving predicted or measured information pertaining to the wireless communication network wherein said predicted or measured information is selected from the group consisting of maintenance data, performance data, cost data, installation data, depreciation data, infrastructure data and ownership data.

63. The network design and management system of claim 30 further comprising means, associated with one or more of said computer platforms for generating one or more reports on predicted or measured information pertaining to the wireless communication network wherein said reports are selected from the group consisting of computer files, tables, lists, slideshows, and graphical outputs.

64. A method for managing a wireless communications network comprised of a plurality of components distributed within a physical environment, at least one of said plurality of components being used to provide infrastructure necessary for wireless communications, comprising the steps of:
measuring with at least one measurement device at least one wireless communication performance data pertaining to the wireless communications network; and
providing with one or more computer platforms on which a computerized site specific model of said physical environment is displayed, at least one of:
(I) an indication that said at least one wireless communication performance data measured by said measurement device is or is not satisfactory in the wireless communications network; or
(II) control signals or instructions for adjusting one or more parameters of one or more of said plurality of components distributed within said physical environment,
at least one of said one or more computer platforms communicates with at least one of said plurality of components,
said computerized site specific model presenting on a display a representation of said physical environment with computer representations of said plurality of components distributed in said representation of said physical environment, wherein said computer representations of said plurality of components is associated with at least one of cost data, infrastructure data, maintenance data, ownership data, performance data, installation data, depreciation data, and equipment settings, and information pertaining to said at least one wireless communication performance data in said physical environment.

65. The method of claim 64 wherein said parameter to be adjusted in said providing step is selected from the group consisting of transmitter power, transmitting frequency, receiving frequency, signal strength, antenna orientation, transmitted power, data rate, modulation method, bandwidth, interference or noise, signal to interference ratio, data throughput, power levels or status, quality of service, data latency, and traffic or capacity utilization.

66. The method of claim 64 wherein said one or more computer platforms provides in said providing step (I) an indication that said at least one wireless communication performance data measured by said at least one measurement device is or is not satisfactory for a particular user in the wireless communications network, and an indication of the value of said at least one wireless communication performance data.

67. The method of claim 64 wherein said one or more computer platforms provides in said providing step (I) an indication that said at least one wireless communication performance data measured by said at least one measurement device is or is not satisfactory for some or all of the users in the wireless communications network, and an indication of the value of said at least one wireless communication performance data.

68. The method of claim 64 further comprising the step of selecting a level of satisfactory or unsatisfactory performance for said wireless communication performance data for one or more users in the wireless communication network.

69. The method of claim 64 wherein said one or more computer platforms provides in said providing step (II) control signals or instructions for adjusting one or more parameters of one or more of said plurality of components distributed within said physical environment.

70. A network design and management method for a wireless communications network, comprising the steps of:
designing or modifying, on one or more computer platforms, a computerized site specific model which presents on a display a representation of a physical environment in which said wireless communications network has or will be deployed, with computer representations of a plurality of components distributed in said representation of said physical environment, wherein one or more of said plurality of components represented in said computerized site specific model has at least one of cost data, infrastructure data, maintenance data, ownership data, performance data, installation data, depreciation data, and equipment settings associated therewith;

distributing a plurality of physical components within said physical environment represented by said computerized site specific model, at least some of said plurality of physical components corresponding to at least some of said plurality of components represented in said computerized site specific model, at least one of said plurality of physical components being used to provide infrastructure for wireless communications;

measuring with at least one measurement device at least one wireless communication performance data pertaining to the performance experienced by one or more users in the wireless communications network; and providing with at least one of said one or more computer platforms at least one of:

(I) an indication that said at least one wireless communication performance data measured by said measurement device is or is not satisfactory for one or more users of the wireless communications network; or (II) control signals or instructions for adjusting one or more parameters of one or more of said plurality of physical components distributed within said physical environment, and at least one of said one or more computer platforms communicates with at least one of said plurality of physical components.

71. The method of claim 70 wherein the step of designing is performed during said designing or modifying step.

72. The method of claim 70 wherein the step of modifying is performed during said designing or modifying step.

73. The method of claim 70 further comprising the step of predicting, with at least one of said one or more computer platforms, one or more wireless communications performance data based on said computerized site specific model.

74. The method of claim 70 wherein said predicting step is performed during said designing or modifying step.

75. The method of claim 70 wherein said parameter to be adjusted in said providing step is selected from the group consisting of transmitter power, transmitting frequency, receiving frequency, signal strength, antenna orientation, transmitted power, data rate, modulation method, bandwidth, interference or noise, signal to interference ratio, data throughput, power levels or status, quality of service, data latency, and traffic or capacity utilization.

76. The method of claim 70 wherein said one or more computer platforms provides in said providing step (I) an indication that said at least one wireless communication performance data measured by said at least one measurement device is or is not satisfactory for a particular user in the wireless communications network, and an indication of the value of said at least one wireless communication performance data.

77. The method of claim 70 wherein said one or more computer platforms provides in said providing step (I) an indication that said at least one wireless communication performance data measured by said at least one measurement device is or is not satisfactory for some or all of the users in the wireless communications network, and an indication of the value of said at least one wireless communication performance data.

78. The method of claim 70 further comprising the step of selecting a level of satisfactory or unsatisfactory performance for said performance data for said one or more users in the wireless communication network.

79. The method of claim 70 wherein said one or more computer platforms provides in said providing step (II) control signals or instructions for adjusting one or more parameters of one or more of said plurality of physical components distributed within said physical environment.

80. A wireless network asset management method, comprising the steps of:

storing, sending, or retrieving information pertaining to at least two different distributed networks of infrastructure equipment, said information being selected from a group consisting of installation data, performance data, cost data, depreciation data, ownership data, infrastructure information, and maintenance data; and selectively retrieving, displaying, aggregating, or analyzing selected information from said at least two different distributed networks, wherein each of said distributed networks of infrastructure equipment is represented in a site-specific computer database model having computer representations of physical locations and interconnections of the infrastructure equipment stored therein, and wherein said performance data comprises performance data selected from the group consisting of frequency utilization, capacity utilization, received signal strength, signal-to-interference ratio, signal-to-noise ratio, bit error rate, loading, capacity, frame error rate, frame resolution per second, traffic, packet error rate, packet latency, packet jitter, interference levels, power levels, outage statistics, failure rate, quality of service, consumption and fluctuation, production levels, storage cycles, cycle time.

81. The wireless network asset management method according to claim 80, wherein said performance data includes at least two of predicted performance data, desired performance data, and measured performance data.

82. The wireless network asset management method according to claim 80, further comprising the step of comparing at least two of said predicted performance data, said desired performance data, and said measured performance data.

83. The wireless network asset management method according to claim 80, wherein said step of selectively retrieving, displaying, aggregating, or analyzing selected information from said at least two different distributed networks includes the step of comparing said selected information from at least a first and a second of said at least two different distributed networks.

84. The wireless network asset management method according to claim 80, wherein said infrastructure information includes information selected from the group consisting of equipment brand, equipment type, equipment settings, equipment configuration, equipment orientation, equipment specifications, equipment parameters, equipment manufacturer, equipment use logs, equipment licensing information, information regarding methods for communicating with the equipment, equipment users, equipment owners, equipment contact information, equipment lessors, equipment lessees, predicted equipment cost, actual equipment cost, predicted equipment failure rate, actual equipment failure rate, predicted equipment maintenance or repair cost, actual equipment maintenance or repair cost, and equipment identifiers.

85. The wireless network asset management method according to claim 80, further comprising the step of controlling at least one component of at least one of said two different distributed networks from a location remote from said distributed networks.

86. A method of generating a computerized model of an environment, said environment including both terrain and at least one building, wherein said terrain surrounds said at least one building, said terrain including a plurality of different objects and features therein, each of which has attributes that impact performance of a distributed network, and said at least one building having a plurality of different objects therein, each of which has attributes that impact performance of said distributed network, comprising the steps of:

obtaining a terrain model for said terrain, said terrain model being represented by a triangular irregular network;

obtaining a building model of said at least one building, said building model being in a vector format compatible with said triangular irregular network;

combining said terrain model and said building model to form a composite three dimensional terrain-building representation, said combining step positioning said building model within said terrain model such that outer edges of said building are positioned within said terrain; and providing one or more of wireless performance predictions or measurements, or comparisons thereof for wireless communications networks operating both within and outside of buildings.

87. The method of claim 86, wherein said combining step sinks said building model into a portion of said terrain model.

88. The method of claim 86, wherein said distributed network of infrastructure components is graphically and electronically represented within said computerized model of an environment in a site-specific manner.

89. The method of claim 86 further comprising the step of providing one or more of cost data, infrastructure information, maintenance data, depreciation data, installation data, performance data, and ownership data pertaining to at least a portion of said distributed network.

90. A system for generating a computerized model of an environment, said environment including both terrain and at least one building, wherein said terrain surrounds said at least one building, said terrain including a plurality of different terrain features therein, each of which has attributes that impact performance of a distributed network, and said at least one building having a plurality of different objects therein, each of which has attributes that impact performance of the distributed network, said system comprising:

means for obtaining a terrain model for said terrain, said terrain model being represented by a triangular irregular network;

means for obtaining a building model of said at least one building, said building model being in a vector format compatible with said triangular irregular network; and means for combining said terrain model and said building model to form a composite three dimensional terrain-building representation, wherein said building positioned within said terrain.

91. The system according to claim 90, wherein a distributed network of infrastructure components is graphically and electronically represented within said computerized model of an environment in a site-specific manner.

92. The system according to claim 90, wherein said means for combining said terrain model and said building model sinks said building model into a portion of said terrain model.

93. The system according to claim 90 further comprising means for providing one or more of wireless performance predictions or measurements, or comparisons thereof for wireless communications networks operating both within and outside of buildings.

94. The system according to claim 90 further comprising means for providing one or more of cost data, depreciation data, installation data, infrastructure information, maintenance data, performance data and ownership data pertaining to at least a portion of said distributed network.

95. A wireless network asset management system, comprising:

means for storing, sending, or retrieving information pertaining to at least two different distributed networks of infrastructure equipment, said information being selected from the group consisting of installation data, performance data, infrastructure information, ownership data, cost data, depreciation data, and maintenance data, wherein said performance data includes at least two of predicted performance data, desired performance data, and measured performance data.; and means for selectively retrieving, displaying, aggregating, or analyzing selected information from said at least two different distributed networks, wherein each of said distributed networks of infrastructure equipment is represented in a site-specific computer database model having computer representations of physical locations and interconnections of the infrastructure equipment stored therein.

96. The wireless network asset management system according to claim 42, wherein said performance data includes performance data selected from the group consisting of frequency utilization, capacity utilization, received signal strength, signal-to-interference ratio, signal-to-noise ratio, bit error rate, loading, capacity, frame error rate, frame resolution per second, traffic, packet error rate, packet latency, packet jitter, interference levels, power levels, outage statistics, failure rate, quality of service, data throughput, temperature, pressure, flow rate, environmental conditions, power consumption and fluctuation, production levels, storage cycles, and cycle time.

97. The wireless network asset management system according to claim 95, wherein said performance data includes at least two of said predicted performance data, desired performance data, and measured performance data.

98. The wireless network asset management system according to claim 97, further comprising means for comparing at least two of said predicted performance data, said desired performance data, and said measured performance data.

99. The wireless network asset management system according to claim 95, wherein said means for selectively retrieving, displaying, aggregating, or analyzing selected information from said at least two different distributed networks includes means for comparing said selected information from at least a first and a second of said at least two different distributed networks.

100. The wireless network asset management system according to claim 95, wherein said infrastructure information includes information selected from the group consisting of equipment brand, equipment type, equipment settings, equipment configuration, equipment orientation, equipment specifications, equipment parameters, equipment manufacturer, equipment use logs, equipment licensing information, information regarding methods for communicating with the equipment, equipment users, equipment owners, equipment contact information, equipment lessors, equipment lessees, predicted equipment cost, actual equipment cost, predicted equipment failure rate, actual equipment failure rate, predicted equipment maintenance or repair cost, actual equipment maintenance or repair cost, and equipment identifiers.

101. The wireless network asset management system according to claim 95, further comprising means for controlling at least one components of at least one of said two different distributed networks from a location remote from said distributed networks.

102. A wireless network asset management method, comprising the steps of:
storing, sending, or retrieving one or more of predicted and measured information pertaining to a distributed network of infrastructure equipment, said one or more of predicted and measured information being selected from the group consisting of cost data, maintenance data, installation data, depreciation data, performance data, and ownership data;
selectively retrieving, displaying, aggregating, or analyzing selected information from said distributed network; and
comparing said predicted information and said measured information, wherein said distributed network of infrastructure equipment is represented in a site-specific computer database model having computer representations of physical locations and interconnections of the infrastructure equipment stored therein.

103. A wireless network asset management system, comprising:
means for storing, sending, or retrieving one or more of predicted and measured information pertaining to a distributed network of infrastructure equipment, said one or more of predicted and measured information being selected from the group consisting of cost data, maintenance data, performance data, and ownership data;
means for selectively retrieving, displaying, aggregating, or analyzing selected information from said distributed network; and
means for comparing said predicted information and said measured information, wherein said distributed network of infrastructure equipment is represented in a site-specific computer database model having computer representations of physical locations and interconnections of the infrastructure equipment stored therein.

104. An infrastructure management tool for wireless communications networks, comprising:
one or more site specific computerized models which represent one or more physical environments, said one or more site specific computerized models includes a representation of a plurality of distributed components that are at least a part of a wireless communications network distributed within a physical environment, said one or more site specific computerized models includes one or more of predicted and measured information selected from the group consisting of cost data, maintenance data, performance data, and ownership data;
means for identifying criteria to be searched in said one or more site specific computerized models; and
means for applying replacement criteria to replace identified criteria identified by said means for identifying, wherein said plurality of distributed components is graphically and electronically represented within said one or more site specific computerized models of the physical environment in a site-specific manner.

105. An infrastructure management method for wireless communication networks, comprising the steps of:
providing access to one or more site specific computerized models which represent one or more physical environments, said one or more site specific computerized models includes a representation of a plurality of distributed components that are at least a part of a wireless communications network distributed within a physical environment, said one or more site specific computerized models includes one or more of predicted and measured information selected from the group consisting of cost data, maintenance data, performance data, and ownership data;
identifying criteria to be searched in said one or more site specific computerized models; and
applying replacement criteria to replace identified criteria identified by said identifying step,
wherein said plurality of distributed components is graphically and electronically represented within said one or more site specific computerized models of the physical environment in a site-specific manner.

* * * * *